United States Patent
Sheik-Nainar et al.

(10) Patent No.: US 10,592,717 B2
(45) Date of Patent: Mar. 17, 2020

(54) BIOMETRIC IMAGING WITH HOVER DETECTION

(71) Applicant: Synaptics Incorporated, San Jose, CA (US)

(72) Inventors: Mohamed Sheik-Nainar, San Jose, CA (US); Justin Mockler, San Jose, CA (US); Adam L. Schwartz, San Jose, CA (US); Erik Jonathon Thompson, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 168 days.

(21) Appl. No.: 15/933,181

(22) Filed: Mar. 22, 2018

(65) Prior Publication Data
US 2018/0218195 A1 Aug. 2, 2018

Related U.S. Application Data

(63) Continuation-in-part of application No. 15/414,364, filed on Jan. 24, 2017.

(60) Provisional application No. 62/288,870, filed on Jan. 29, 2016.

(51) Int. Cl.
*G06K 9/00* (2006.01)

(52) U.S. Cl.
CPC ..... *G06K 9/00013* (2013.01); *G06K 9/00919* (2013.01)

(58) Field of Classification Search
None
See application file for complete search history.

(56) References Cited

U.S. PATENT DOCUMENTS

| | | | | |
|---|---|---|---|---|
| 6,766,040 B1* | 7/2004 | Catalano | ............ | G06K 9/00067 340/5.53 |
| 7,609,865 B2* | 10/2009 | Chen | .................. | G06K 9/00033 382/124 |
| 8,311,514 B2 | 11/2012 | Bandyopadhyay et al. | | |
| 8,614,693 B2* | 12/2013 | King | ..................... | G06F 3/0416 345/174 |
| 8,897,496 B2* | 11/2014 | Hildreth | .................. | G06F 3/017 382/103 |
| 9,098,138 B2* | 8/2015 | King | ..................... | G06F 3/0416 |
| 9,251,329 B2* | 2/2016 | Lien | ........................ | G06F 21/32 |
| 9,589,171 B1* | 3/2017 | Larsson | ............... | G06K 9/0002 |

(Continued)

OTHER PUBLICATIONS

Koller, Dieter, et al. "3D Capturing of Fingerprints—On the way to a contactless certified sensor." BIOSIG 2011—Proceedings of the Biometrics Special Interest Group (2011). (Year: 2011).*

(Continued)

*Primary Examiner* — Andrae S Allison
(74) *Attorney, Agent, or Firm* — Leydig, Voit & Mayer, Ltd.

(57) ABSTRACT

A method and system for fingerprint imaging in an electronic device having a display, a touch sensor with a touch interface and an optical fingerprint sensor with a sensing region is described. The method and system include placing the electronic device in a hover detect mode, the hover detect mode scanning for a hovering finger; detecting the hovering finger; initiating illumination in the sensing region to image a fingerprint of the finger; capturing an image of the fingerprint in the sensing region; and disabling the illumination in the sensing region.

33 Claims, 14 Drawing Sheets

(56) References Cited

U.S. PATENT DOCUMENTS

| | | | | |
|---|---|---|---|---|
| 10,261,636 B2* | 4/2019 | Wang | | G06F 3/044 |
| 10,296,129 B2* | 5/2019 | Wang | | G06F 3/0416 |
| 10,310,660 B2* | 6/2019 | Wang | | G06F 3/0416 |
| 2005/0078093 A1 | 4/2005 | Peterson et al. | | |
| 2005/0146513 A1 | 7/2005 | Hill et al. | | |
| 2008/0223925 A1 | 9/2008 | Saito et al. | | |
| 2009/0174679 A1 | 7/2009 | Westerman | | |
| 2010/0180136 A1 | 7/2010 | Thompson et al. | | |
| 2010/0292945 A1* | 11/2010 | Reynolds | | G06F 3/044 |
| | | | | 702/65 |
| 2011/0157089 A1* | 6/2011 | Rainisto | | G06F 3/017 |
| | | | | 345/175 |
| 2012/0154303 A1 | 6/2012 | Lazaridis et al. | | |
| 2012/0191993 A1 | 7/2012 | Drader et al. | | |
| 2012/0236388 A1 | 9/2012 | De Wind et al. | | |
| 2012/0306811 A1 | 12/2012 | Farmer et al. | | |
| 2013/0100044 A1 | 4/2013 | Zhao et al. | | |
| 2013/0135247 A1 | 5/2013 | Na et al. | | |
| 2013/0300704 A1 | 11/2013 | Takahashi et al. | | |
| 2014/0092031 A1* | 4/2014 | Schwartz | | G06F 1/3206 |
| | | | | 345/173 |
| 2014/0149754 A1 | 5/2014 | Silva et al. | | |
| 2014/0198960 A1* | 7/2014 | Thompson | | G06K 9/00013 |
| | | | | 382/124 |
| 2014/0225863 A1* | 8/2014 | Tanaka | | G06F 3/044 |
| | | | | 345/174 |
| 2014/0368423 A1 | 12/2014 | Brenckle et al. | | |
| 2015/0009171 A1* | 1/2015 | Shepelev | | G06F 3/044 |
| | | | | 345/174 |
| 2015/0074615 A1* | 3/2015 | Han | | G06K 9/00033 |
| | | | | 715/863 |
| 2015/0103034 A1 | 4/2015 | Shepelev et al. | | |
| 2015/0123931 A1 | 5/2015 | Kitchens et al. | | |
| 2015/0127965 A1 | 5/2015 | Hong et al. | | |
| 2015/0149801 A1 | 5/2015 | Vandermeijden et al. | | |
| 2015/0217450 A1 | 8/2015 | Huang et al. | | |
| 2015/0286313 A1* | 10/2015 | Vandermeijden | | G06F 3/044 |
| | | | | 345/174 |
| 2016/0034741 A1 | 2/2016 | Lan et al. | | |
| 2016/0132712 A1* | 5/2016 | Yang | | G06K 9/0002 |
| | | | | 348/77 |
| 2016/0224816 A1* | 8/2016 | Smith | | G02B 27/58 |
| 2016/0247010 A1* | 8/2016 | Huang | | G02B 5/20 |
| 2017/0075453 A1* | 3/2017 | Nakaizumi | | G06F 3/0418 |
| 2017/0102758 A1* | 4/2017 | Siaw | | G06F 3/04883 |
| 2018/0129798 A1* | 5/2018 | He | | G06K 9/00013 |

OTHER PUBLICATIONS

MacRitchie, Jennifer, and Andrew P. McPherson. "Integrating optical finger motion tracking with surface touch events." Frontiers in psychology 6 (2015): 702. (Year: 2015).*

International Search Report and Written Opinion for PCT/US2017/014936, dated Apr. 18, 2017.

Qualcomm-Vivo Under-Disp0lay Fingerprint Sensor: First Look—YouTube (3 pages); https://www.youtube.com/watch?v=5H6aWP0NUSI), Mar. 8, 2018.

Goodix's in-display fingerprint sensor—YouTube (2 pages); https://www.youtube.com/watch?v=rGKz9OV4cMY; Mar. 8, 2018.

European Search Report dated Jul. 18, 2019 in EP Patent Application No. 17744838.8.

* cited by examiner

BIOMETRIC IMAGING WITH HOVER DETECTION

CROSS REFERENCE TO RELATED APPLICATIONS

This application is a continuation-in-part of U.S. patent application Ser. No. 15/414,364, entitled "Initiating Fingerprint Capture with a Touch Screen Device," filed Jan. 24, 2017, which claims the benefit of U.S. Provisional Application Ser. No. 62/288,870, entitled "Illumination of Display Integrated Fingerprint Sensor," filed Jan. 29, 2016, the contents of each of which are expressly incorporated by reference.

FIELD

This disclosure generally relates to sensors, and more particularly to a biometric sensor.

BACKGROUND

Input devices including touch sensor devices (also commonly called touchpads, touch screens, or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

Minimizing false or unnecessary wake up of a host-processor or other components associated with the electronic system, touch sensor device and/or fingerprint sensor device may be desirable to minimize power consumption. Conventional wake up schemes rely on a button press to signal when wake up of the fingerprint sensor may be necessary. Further, certain biometric sensors rely upon illumination or other activation of a sensing area in connection with biometric imaging. The illumination or other activation may introduce latency and/or impact the visual presentation of a display of a user device.

SUMMARY

One embodiment provides a method for imaging a fingerprint of a finger in an electronic device. The electronic devices includes a display, a touch sensor having a touch interface, and an optical fingerprint sensor having a sensing region. The method includes placing the electronic device in a hover detect mode, the hover detect mode scanning for the finger hovering proximate to the touch interface; detecting the finger while the finger is hovering; initiating illumination in the sensing region; capturing an image of the fingerprint of the finger in the sensing region; and disabling the illumination in the sensing region.

Another embodiment provides an electronic device. The electronic device includes a memory; and one or more processors in communication with the memory. The one or more processors are configured to operate the electronic device in a hover detect mode, the hover detect mode scanning for a finger hovering proximate to a touch interface; receive a signal when the finger hovering proximate to the touch interface is detected; initiate illumination in a sensing region of an optical sensor; receive image data corresponding to an image of a fingerprint of the finger from the sensing region; and disable the illumination in the sensing region.

Yet another embodiment provides an electronic device. The electronic device includes a memory; and a touch controller in communication with the memory. The touch controller is configured operate in a hover detect mode, the hover detect mode scanning for a finger hovering proximate to a touch interface; detect the finger while the finger is hovering proximate to the touch interface; first signal that the finger has been detected to initiate illumination in a sensing region of an optical sensor; and second signal to disable the illumination in the sensing region after capturing an image of a fingerprint of the finger.

DETAILED DESCRIPTION

Figure 1:
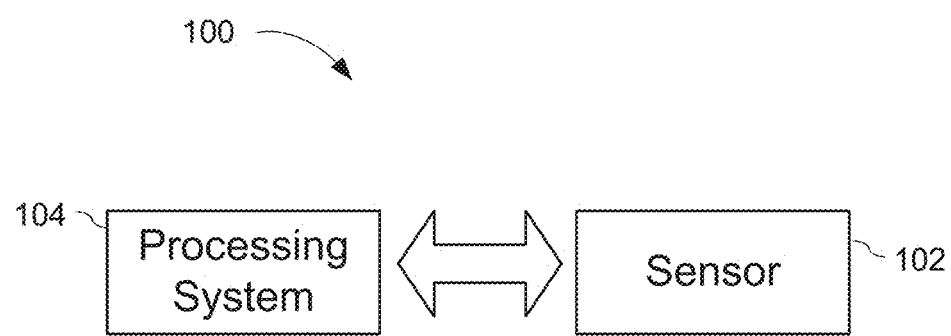
FIG. 1 is a block diagram of an exemplary input device.

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Fingerprint sensor devices may use various wake up and finger presence detection schemes to minimize power consumption and latency, which factors are considered important operating parameters for mobile devices. Conventional wake up schemes typically rely on physical button presses and other techniques that are difficult to implement or that detract from usability when a fingerprint sensor is integrated within the display active area. Electrical contact measurements from the button area or variance checks within the fingerprint sensor can be used to check for a human finger before initiating the fingerprint read. However, these can be inaccurate or impractical to implement when the fingerprint sensor is integrated within the active area of the display or when the fingerprint sensor uses non-capacitive sensing technologies (e.g., optical, ultrasonic, etc.) to capture the fingerprint. Such methods may also require additional components or add complexity to the system and fingerprint sensor design, and the need for a button press can detract from usability.

Techniques for using a touch screen sensor (also referred to as simply "touch sensor") to wake up the fingerprint sensor device and initiate fingerprint capture when the fingerprint sensor is integrated in the active area of a display are described herein. Techniques for minimizing false wake up of a host-processor, which can also be important for minimizing power consumption, are also described. Using the touch screen sensor to check for finger presence and also validate a fingerprint touch avoids the need for mechanical button presses to initiate device wake up from a sleep state. In some embodiments, the fingerprint sensor itself may be used in combination with, or in place of, the touch sensor for validation and wake up.

When the fingerprint sensor is integrated within an active display area of an electronic device, there may be no mechanical button or tactile features that allow the user to easily locate the fingerprint area. Inaccurate finger placement can lead to false rejections and frustration for the user. The systems and methods described herein can mitigate such problems by optionally illuminating the fingerprint sensing area to guide user finger placement when it detects a hovering finger and before the finger touches down on the sensing surface.

Additionally, when the fingerprint sensing area is integrated within the active area of the display, the display light may be used to illuminate the fingerprint sensing area for optical finger sensing or other purposes. If the touch sensor is used to initiate illumination of the fingerprint sensing area within the display, latency and power consumption can be reduced by using a direct communication between a touch controller and a display controller thereby obviating the need to wake up the host.

In accordance with the foregoing, the systems and methods described may use a wake up scheme that first uses a low power scan ("doze mode") to check for the presence of a finger. The doze mode may be carried out by a touch controller or alternatively a fingerprint controller. After finger presence is detected, the system and method may capture more detailed information during a "validation mode" from the touch sensor and/or fingerprint sensor, including information both within and outside of a fingerprint sensing area. This more detailed information may then be used to check for a valid fingerprint touch before waking (or fully waking) the fingerprint controller and initiating the fingerprint capture. For example, in the validation mode, information such as the size of a touch, location of the touch, or the presence of multiple touches, may be used to validate a touch for fingerprint sensing before capturing a fingerprint to avoid false activations.

Furthermore, the system and method may be used to detect a hovering finger by placing the electronic device in a hover detect mode. In response to detecting a hovering finger, the system may initiate illumination of the fingerprint sensing area to guide user finger placement before the finger touches down on the sensing surface. For optical fingerprint sensing, the display may be used to illuminate the finger as part of the optical imaging process. In certain embodiments, upon detection of a hovering finger, a High Brightness Mode ("HBM") is initiated. In HBM, the intensity of lighted emitted from a first portion of the display used for fingerprint imaging is increased. During the transition to HBM, a second portion of the display that is not used for fingerprint imaging may also be adjusted. For example, the second portion may be placed in a Dark Background Mode ("DBM"), such that pixels in the second portions are turned dark, e.g., turned off. As an alternative, the second portion is adjusted to compensate for an increased current provided to the first portion display during HBM so that a consistent display is provided to the user. Once the finger is imaged, the HBM can be turned off and, if applicable, remaining portions of the display returned to a prior state or placed in a new state.

In certain embodiments, a touch screen controller may utilize a direct connection to a display controller (e.g., without communication through a host) to illuminate the fingerprint sensing area via the display with reduced latency. Thus, communication between the touch controller, fingerprint controller and other system components such as a display controller (e.g., Display Driver Integrated Circuit ("DDIC")) can be used to initiate stages in a system wake up procedure before the host is awoken. For example, the touch controller can directly activate the display controller to display graphics and provide illumination (in the case of an optical fingerprint sensor) and/or directly wake up the fingerprint controller thereby improving latency and power consumption without the need to push a button for wake up.

Furthermore, communications between the touch controller, fingerprint controller, and other system components such as a display controller can also facilitate fingerprint functions after the wake up signal has been sent to the host while the host is still initializing. For example, the fingerprint controller can wake up and be fully operational in tens of milliseconds, whereas the host may take hundreds of milliseconds to fully boot up. While the host is waking, the touch controller, display controller, and fingerprint controller may work together to capture fingerprint images (or subsets of images) and use various metrics to improve the quality of the final image. For example, the touch controller may communicate to the fingerprint controller when the finger has settled ("frame selection") so that the fingerprint controller need not capture a full resolution image until the finger is ready. Alternatively, the fingerprint controller and display controller may iterate or auto-calibrate illumination and exposure settings to ensure that the final image is the best quality possible. By the time the host has finished initializing, the best quality fingerprint may already be captured and ready to send, thereby reducing the overall system latency and improving the user's experience.

Furthermore, the fingerprint controller may further validate that the object contacting a sensing surface is indeed a finger before waking the host. For example, the fingerprint controller may look for the presence of ridges and valleys.

Thus, the fingerprint controller may be used instead of, or in conjunction with, the touch sensor as part of the validation process.

Turning the drawings, FIG. 1 is a block diagram of an exemplary input device 100. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional example electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, a sensor 102 is included with the input device 100. The sensor 102 comprises one or more sensing elements configured to sense input provided by one or more input objects in a sensing region. Examples of input objects include fingers, styli, and hands. The sensing region encompasses any space above, around, in and/or near the sensor 102 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 may utilize any suitable combination of sensor components and sensing technologies to detect user input in the sensing region. Some implementations utilize arrays or other regular or irregular patterns of multiple sensing elements to detect the input. Exemplary sensing techniques that the input device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

In one example, the input device 100 may use resistive sensing techniques where contact from an input object closes an electrical circuit and can be used to detect input. In one exemplary technique, the sensor 102 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the input device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the input device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One exemplary acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the input device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include CMOS image sensor arrays, CCD arrays, photodiodes, and other suitable photo-sensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass (or other transparent material) to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the input device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One exemplary technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another exemplary technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

It will be understood that the input device 100 may use multiple sensing technologies. As but one non-limiting example, the input device 100 may use capacitive sensing to detect positioning, gestures, etc. of an input object, while using optical sensing for other purposes such as fingerprint imaging.

In FIG. 1, a processing system 104 is included with the input device 100. The processing system 104 comprises parts of or all of one or more integrated circuits (ICs) and/or other circuitry components and typically includes a CPU, memory and the like. The processing system 104 is coupled to the sensor 102, and is configured to detect input in the sensing region using sensing hardware of the sensor 102. The processing system may be dedicated to the sensor 102 or may be implemented as part of a host processor for the electronic system.

The processing system 104 may include driver circuitry configured to drive sensing signals with sensing hardware of the input device and/or receiver circuitry configured to receive resulting signals with the sensing hardware. For example, a processing system for a mutual capacitance sensor device may comprise transmitter circuitry configured to transmit signals with one or more transmitter sensor electrodes of the sensor 102, and/or receiver circuitry configured to receive resulting signals with one or more receiver sensor electrodes of the sensor 102. As another example, a processing system for a self capacitance sensor device may comprise driver circuitry configured to drive absolute capacitance signals onto one or more sensor electrodes of the sensor 102, and/or receiver circuitry configured to receive resulting signals with the same or different sensor electrodes of the sensor 102. As a further example, a processing system for an ultrasonic sensor device may comprise driver circuitry configured to drive acoustic signals with ultrasonic transmitter elements, and/or receiver circuitry configured to receive signals with ultrasonic receiving elements. As a yet further example, a processing system for an optical sensor device may comprise driver circuitry configured to drive illumination signals to one or more LEDs or other light sources, and/or receiver circuitry configured to receive signals with optical sensing elements.

The processing system 104 may include electronically-readable instructions, such as firmware code, software code, and/or the like. The processing system 104 can be implemented as a physical part of the sensor 102, or can be physically separate from the sensor 102. Also, constituent components of the processing system 104 may be located together, or may be located physically separate from each other. For example, the input device 100 may be a peripheral coupled to a computing device, and the processing system 104 may comprise software configured to run on a central processing unit of the computing device and one or more ICs (e.g., with associated firmware) separate from the central processing unit. As another example, the input device 100 may be physically integrated in a mobile device, and the processing system 104 may comprise circuits and firmware that are part of a main processor of the mobile device. The processing system 104 may be dedicated to implementing the input device 100, or may perform other functions, such as operating display screens, driving haptic actuators, etc.

The processing system 104 may operate the sensing element(s) of the input device 100 to produce electrical signals indicative of input (or lack of input) in the sensing region. The processing system 104 may perform any appropriate amount of processing on the electrical signals in producing the information provided to the electronic system. For example, the processing system 104 may digitize analog electrical signals obtained from the sensor electrodes. As another example, the processing system 104 may perform filtering or other signal conditioning. As yet another example, the processing system 104 may subtract or otherwise account for a baseline, such that the information reflects a difference between the electrical signals and the baseline. As yet further examples, the processing system 104 may determine positional information, recognize inputs as commands, recognize handwriting, match biometric samples, and the like.

Figure 3A:
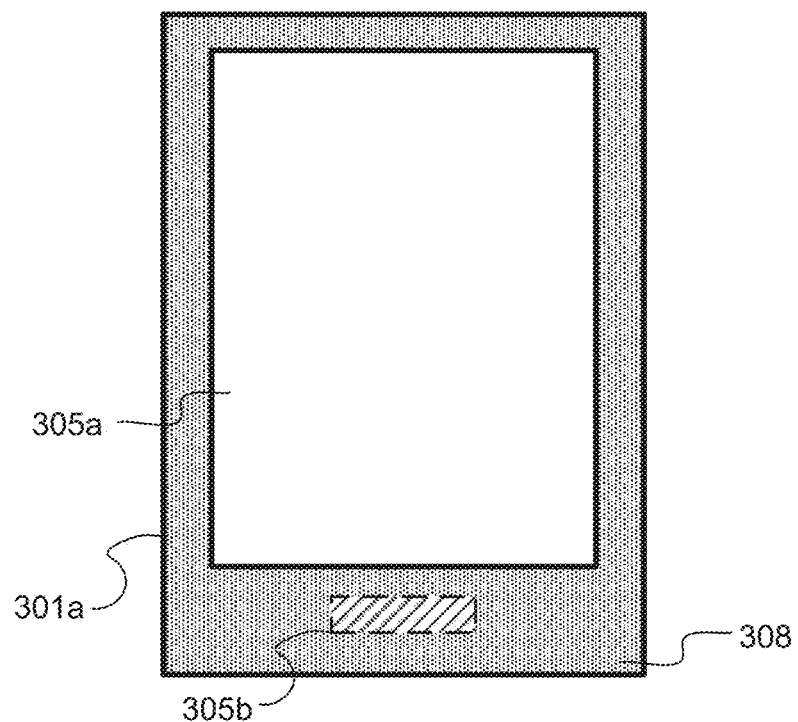
FIGS. 3A-3B are block diagrams illustrating exemplary electronic devices having both a touch screen interface and a fingerprint sensing interface.
Figure 3B:
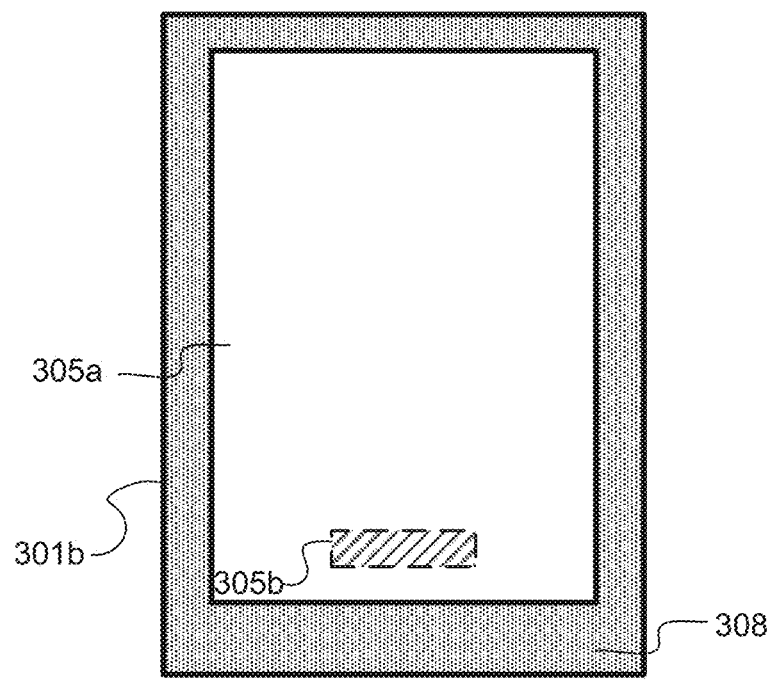
Figure 4:
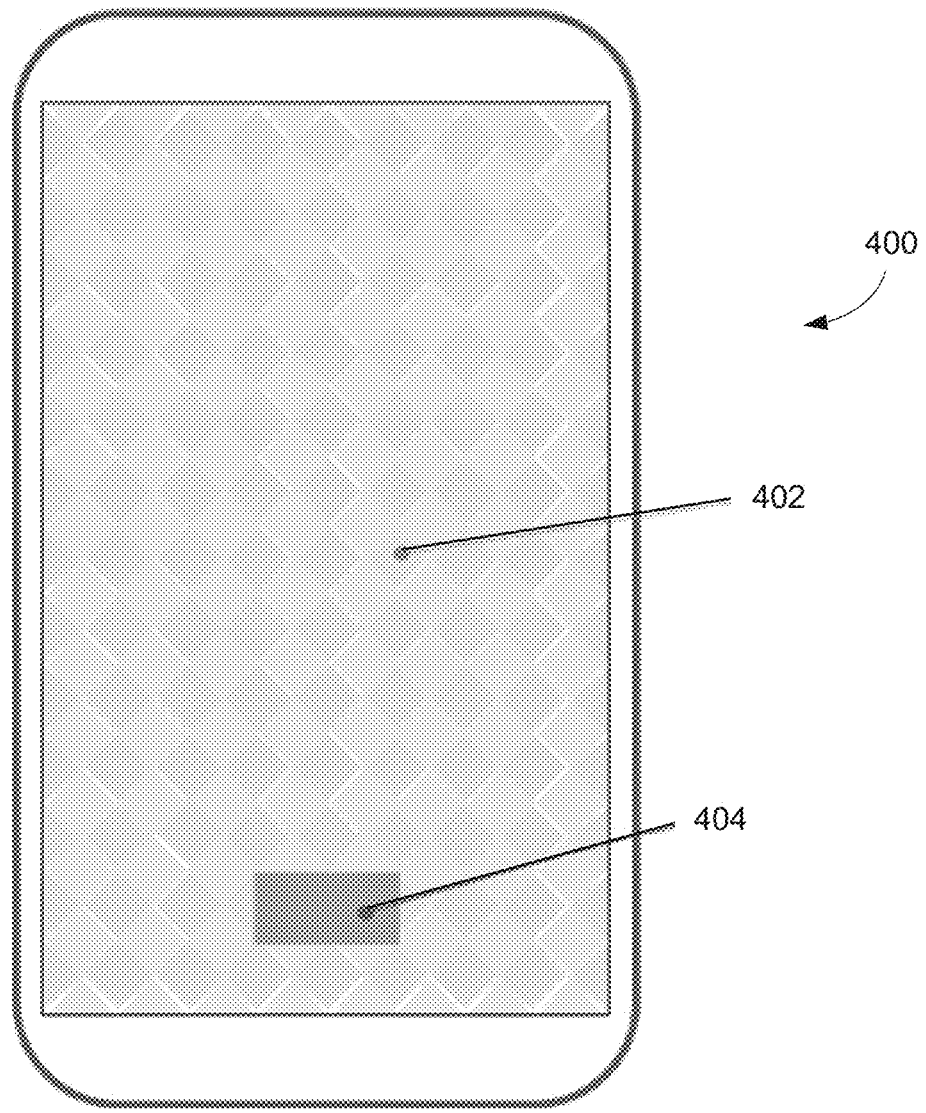
FIG. 4 is a block diagram of an exemplary electronic device having a fingerprint sensor in the active display area.

As described further in connection with FIGS. 3A, 3B, and 4, the sensing region of the input device 100 may overlap part or all of an active area of a display device, for example, if the sensor 102 provides a touch screen interface. The display device may be any suitable type of dynamic display capable of displaying a visual interface to a user, including an inorganic light emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for TFT circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire.

The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 104 in communication with the input device.

Figure 2A:
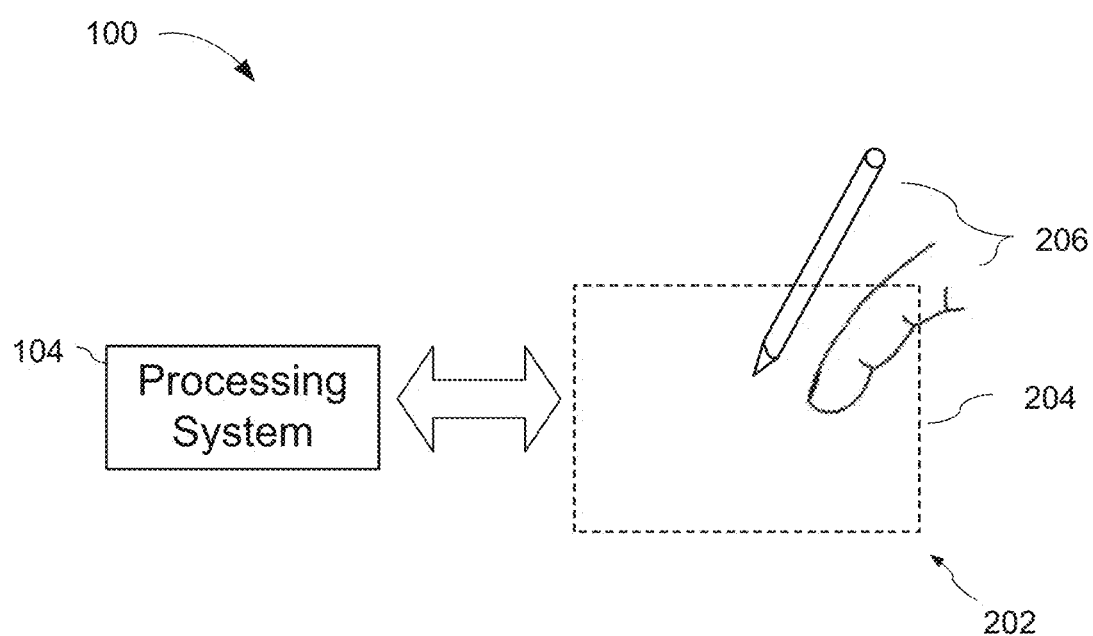
FIGS. 2A-2B are block diagrams of other exemplary input devices.
Figure 2B:
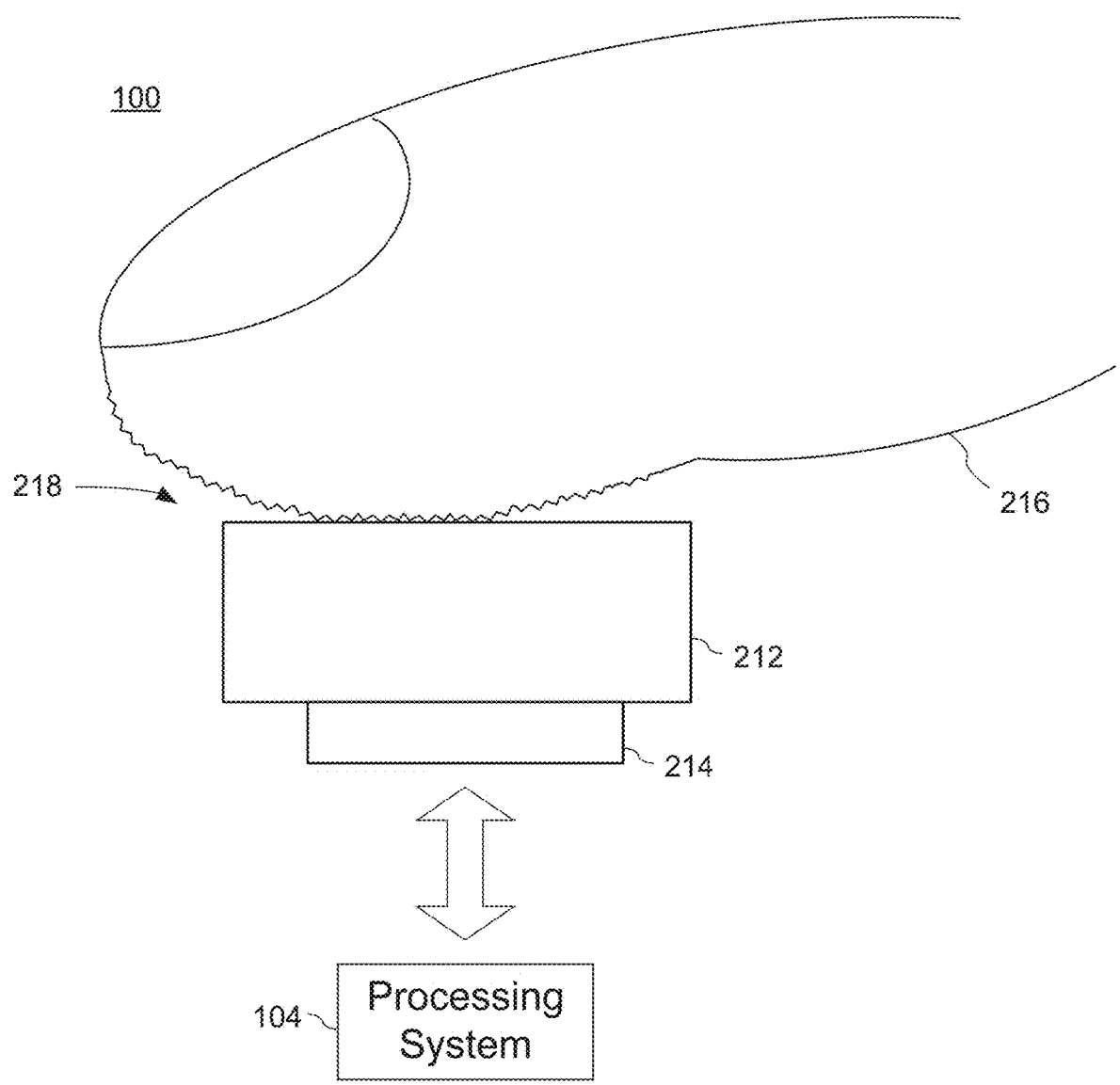

FIGS. 2A-2B depict further exemplary input devices 100. In FIG. 2A, the input device 100 is shown as including a touch sensor 202. The touch sensor 202 is configured to detect position information of an input object 206 within the sensing region 204. The input object 206 may include a finger or a stylus, as shown in FIG. 2A. The sensing region 204 may include an input surface having a larger area than the input object. The touch sensor 202 may include an array of sensing elements with a resolution configured to detect a location of a touch to the input surface. The sensing region 204, or a portion thereof, may also be used as a fingerprint sensor.

In FIG. 2B, the input device 100 is shown as including a fingerprint sensor 214, which may in certain embodiments be integrated with the touch sensor 202. The fingerprint sensor 214 is configured to capture a fingerprint from a finger 216. The sensor 214 is disposed underneath a cover layer 212 that provides an input surface for the fingerprint to be placed or swiped over the sensor 214. The sensing region 218 may include an input surface with an area larger than, smaller than, or similar in size to a full fingerprint. The fingerprint sensor 214 has an array of sensing elements with a resolution configured to detect surface variations of the finger 216, and the fingerprint sensor 214 typically has a higher resolution than the touch sensor 202 of FIG. 2A.

As previously described, any suitable technology may be used for the touch sensor and fingerprint sensor (e.g., capacitive, optical, ultrasonic and combination thereof).

FIGS. 3A-3B are block diagrams illustrating exemplary electronic devices 301a and 301b having both a touch screen interface and a fingerprint sensing interface. In FIG. 3A, the electronic device (e.g., a mobile device, such as a smartphone or tablet) 301a has a fingerprint sensor 305b that is separate from a touch sensor 305a, such that the fingerprint sensor and the touch sensor (of the touch screen) have separate interfaces. In FIG. 3B, the electronic device 300b has a fingerprint sensor 305b that is integrated with the touch sensor 305a, such that the interface for the fingerprint sensor overlaps with the interface for the touch sensor. It will be appreciated that the fingerprint sensor 305b may be limited to only a subset of the area of the touch sensor 305a as generally shown or may be cover an area that is generally coextensive with the touch sensor 305a.

FIG. 4 is a block diagram illustrating another exemplary electronic device 400 having both a touch sensor 402 and a fingerprint sensor 404 integrated in the active area of a display. In certain embodiments, the fingerprint sensor 404 wakes the electronic device 400 (host) from sleep upon authentication of the user. Normally, the display is off or dimmed when the device is in low-power "sleep" mode. When the fingerprint sensor 404 is underneath the cover lens of the display and the device is in sleep mode, it may be difficult for the user to locate the biometric sensor because the display is off and cannot provide an indication of the fingerprint sensor's location. Having an alternate low-power illumination source can provide a visual indication to the user of the location of the fingerprint sensor when the display is off.

Figure 5:
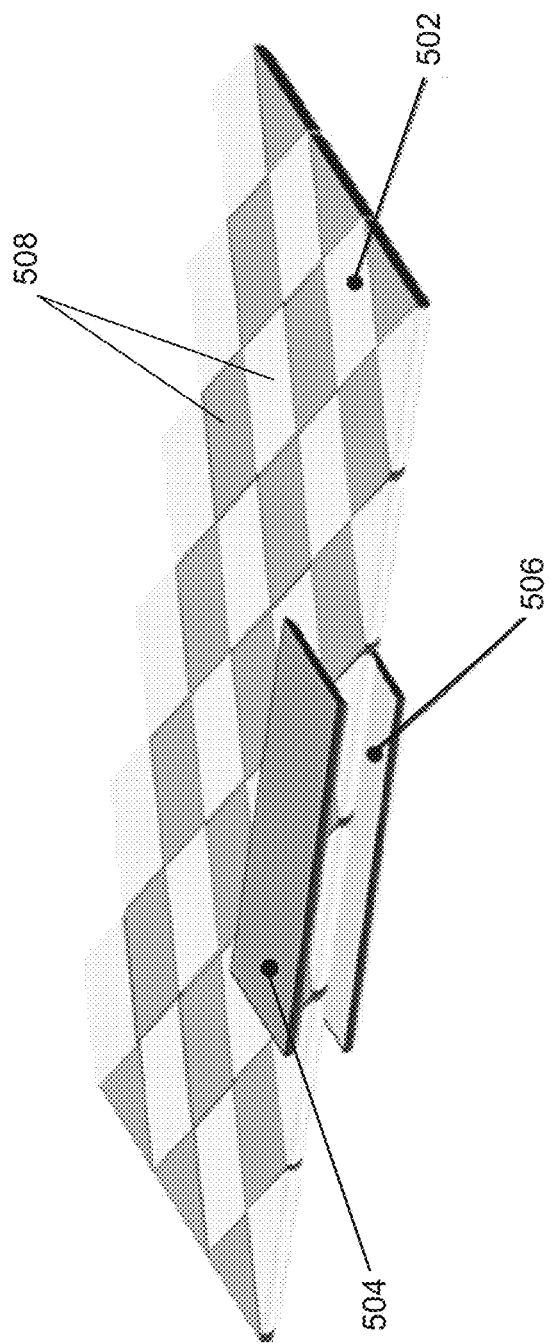
FIG. 5 is a block diagram of an exemplary illumination source underneath a display.

In accordance with the foregoing, FIG. 5 depicts an exemplary illumination device or element 506 that illuminates the location of a fingerprint sensor 504 where the fingerprint sensor 504 is in the active area of a display 502. Also shown is a diamond pattern touch sensor 508 in the active area of the display 502. Examples of illumination devices 506 include a bulk OLED or discrete LEDs driving a plastic light diffuser from the side. The power consumption of the illumination element 506 can be reduced by dimming the illumination device (by, for instance, lowering the drive current and/or lowering the drive duty-cycle) or by "throbbing" the illumination device (turning it on for a period of time, and then off for a period of time and repeating).

By construction, some displays are transparent or semitransparent. The illumination device 506 may be placed underneath such a transparent or semitransparent display. In such a configuration, the fingerprint sensor 504 may also be in or above the display. For example, the fingerprint sensor may include a substantially transparent sensor electrode pattern formed of ITO, micro wires, or some combination thereof, disposed above the display, with an illumination element 506 mounted below or underneath the display to indicate the location of the fingerprint sensing area. During sleep, this illumination device can be driven by a touch controller or fingerprint IC/controller.

In the example of FIG. 5, a discrete illumination device 506 is shown for illuminating a discrete fingerprint sensor 504. In some embodiments, the fingerprint sensor may be integrated throughout the display in which case select display elements (e.g., LEDs, OLEDs, LCD pixels etc.) may be used to illuminate the fingerprint sensing area.

Figure 6:
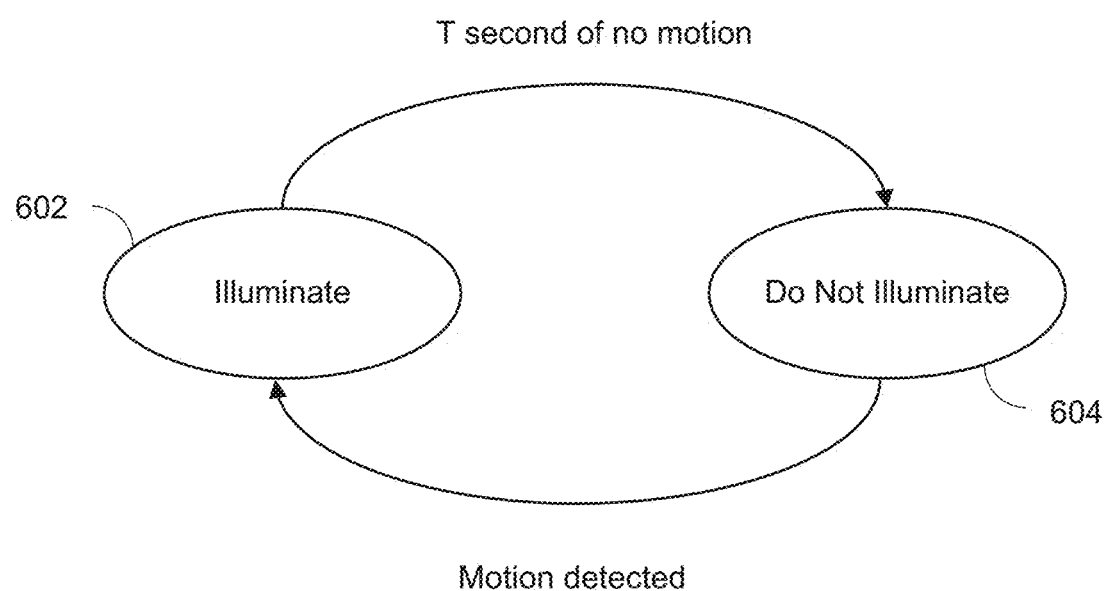
FIG. 6 is a flow diagram of an exemplary method to illuminate a fingerprint sensor.

FIG. 6 depicts an exemplary operating method for the illumination device for the fingerprint sensor using a motion sensor, such as an accelerometer. In FIG. 6, the accelerometer of a mobile device is used to detect motion, which is then used to initiate illumination of the fingerprint sensor location. As depicted in FIG. 6, in response to motion being detected by the accelerometer, the illumination device illuminates the fingerprint sensor location (state 602). After T seconds of no motion, the illumination device is turned off (and thus illumination of the fingerprint sensor location by the illumination device is stopped as shown in state 604).

It will be understood that the fingerprint sensor does not have to be positioned within the active display area, such as shown in FIG. 3B. It may be helpful, for example, to provide illumination of the fingerprint sensor if it is anywhere under the cover glass or cover lens or otherwise locate on the device such as shown in FIG. 3A. Moreover, the illumination element 506 may have other uses. For example, the illumination element 506 can flash if the user does not authenticate during fingerprint process. Further, for an OLED display, the illumination could be provided at low power by just activating selected pixels of the OLED display in the fingerprint sensor area. Furthermore, only a subset of sub-pixels, such as green, could be used to provide the low-power illumination.

Figure 7A:
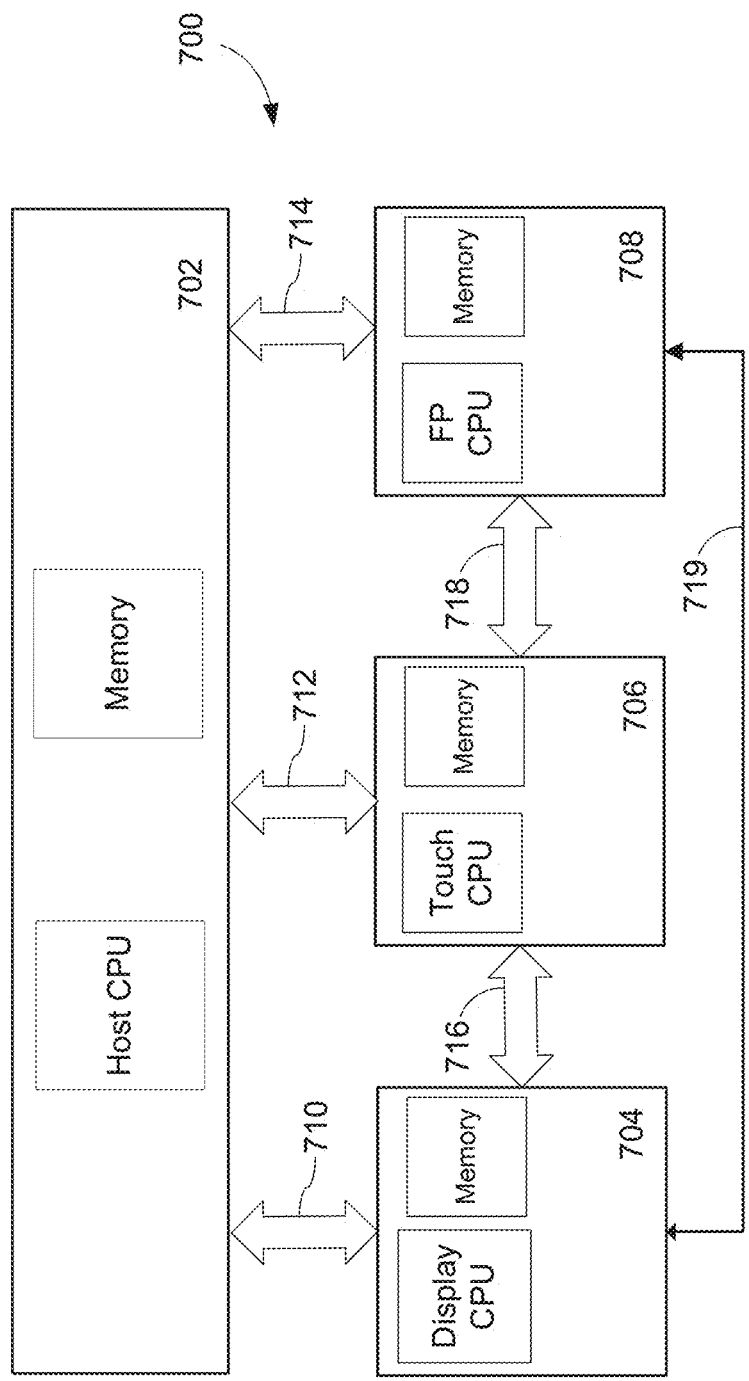
FIG. 7A-7B are block diagrams illustrating control circuitry architecture for an electronic device according to certain embodiments.

FIG. 7A illustrates an example of an architecture of control circuitry 700 for an electronic device having a touch sensor and a fingerprint sensor as shown and described in connection with the preceding figures. The control circuitry 700 includes a host 702, a display controller 704, a touch controller 706, and a fingerprint controller 708. The architecture of FIG. 7A may be used, for example, to implement the wake up method described in connection with FIG. 8.

The host 702 includes a processing system (e.g., host CPU, memory and supporting circuitry and software) for the electronic device, such as a mobile phone or other electronic device as described in the preceding examples. The host typically includes electrical interfaces (e.g., 710, 712, 714) for communicating with the display controller 704, touch controller 706 and fingerprint controller 708.

The display controller 704 includes a processing system (display CPU, memory, etc.) for the display of the electronic device. An example of a display controller 704 is a Display Driver Integrated Circuit (DDIC). The display controller 704 connects to and drives the display of the electronic device, e.g., controls the display of graphics, text and like which are visible to user on a display, such as an OLED or LCD display. The display controller 704 may also store preconfigured frames for displaying graphics to facilitate certain processes. For example, in certain embodiments, the display controller 704 may illuminate a portion of the display corresponding to a fingerprint sensing region (e.g., create a finger placement guide or target) and/or may provide illumination of a finger for imaging using an optical fingerprint sensor. The display controller 704 may also provide color indicative of match/no match when a fingerprint is captured.

The fingerprint controller 708 includes a processing system (fingerprint CPU, memory, etc.) for interfacing with a fingerprint sensor (e.g., array of optical, capacitive, ultrasonic sensing elements) which have the granularity to detect fingerprint features such as ridges and valleys and in some cases small features such as pores. The fingerprint controller 708 may be integrated with the fingerprint sensor, or interface to a separate fingerprint sensor. The fingerprint sensor may extend over an entire region of a touch sensing area (e.g., display) or only a discrete portion thereof. Alternatively, the fingerprint sensor may be included in a distinct area as compared to the touch sensing area. When a fingerprint is captured, the fingerprint controller 708 can send a fingerprint image to the host 702 for matching against an enrollment template. Alternatively, if the fingerprint controller 708 is equipped with fingerprint matching capabilities, the fingerprint controller 708 may perform matching (e.g., comparison of the captured fingerprint against enrollment template) itself and, if necessary, wake the host 702 after a successful fingerprint authentication.

The touch controller 706 includes a processing system (touch CPU, memory, etc.) for interfacing with a touch sensor of the electronic device. The touch controller 706 may, for example, be a touch application specific integrated circuit (ASIC). The touch controller includes control circuitry and software and interfaces with the touch sensor (e.g., array of touch sensing elements, which may be integrated with a display) to sense and process touches by an input object such as a stylus or finger. Any suitable technology may be used for the touch sensor including capacitive touch sensing, optical touch sensing and the like as previously described.

In certain embodiments, the touch controller 706 uses two-way communication with the display controller 704, represented by electrical interface 716, and fingerprint controller 708, represented by electrical interface 718. Direct connection between the touch controller 706 and fingerprint controller 708 allows, for example, the touch controller 706 to send a signal to wake up the fingerprint controller 708 and initiate fingerprint capture in response to a valid touch without waking the host 702. Direct connection between touch controller 706 and display controller 704 allows the display to be used as a light source for illuminating the finger for an optical fingerprint sensor without waking the host 702. It will be understood, however, that the host 702 may optionally be used for communicating with the touch controller 706, display controller 704 and/or fingerprint controller 708 at any point in the process.

In certain embodiments, the fingerprint controller 708 may have direct two-way communication with the display controller 704, represented by electrical interface 719. In this embodiment, the touch controller 706 can wake up the fingerprint controller 708 upon detection of a finger. When ready to image a fingerprint, the fingerprint controller 708 can send a signal directly to the display controller 704 to provide illumination of a corresponding area on the display for optical imaging. Once the fingerprint is imaged, the fingerprint controller 708 can send another signal to the display controller 704 and the display controller 704 can turn off the corresponding area of the display for purposes of imaging or provide a visual signal that fingerprint imaging is complete. The direct two-way communication with the display controller 704 also allows the fingerprint controller 708 to control other aspects of the display such as, for example, displaying a target zone for placement of the finger.

It will be understood that the same or different technologies can be used for touch sensing and fingerprint sensing. For example, the touch sensor and fingerprint sensor can both be capacitive or can both be optical. Alternatively, the touch sensor may be capacitive while the fingerprint sensor is optical or vice versa.

Figure 7B:
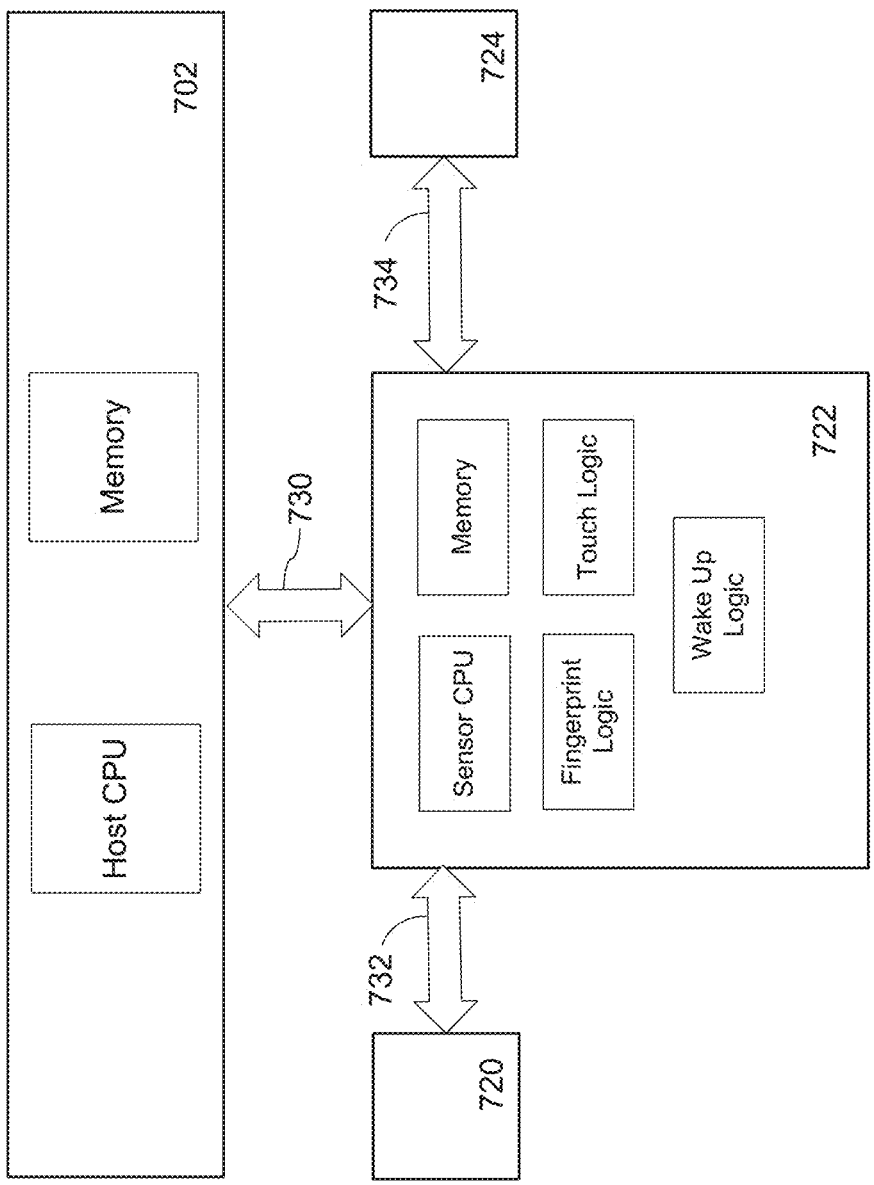

Although shown as separate components, the display controller 704, touch controller 706 and/or fingerprint controller 708, or portions thereof, may be combined on a single controller as illustrated, for example, in connection with FIG. 7B. Similar to FIG. 7A, the architecture of FIG. 7B includes a host 702 having a host CPU and memory. However, in FIG. 7A, the fingerprint controller 708 and touch controller 706 each have their own respective CPU and memory. In FIG. 7B, the fingerprint controller is replaced with an analog fingerprint sensor circuit 720 and the touch controller is replaced with an analog touch sensor circuit 724. The analog fingerprint sensor circuit 720 and/or analog touch sensor circuit 724 may be implemented using any suitable means such as discrete circuits or as separate ICs. The analog fingerprint sensor circuit 720 and/or analog touch sensor circuit 724 may include analog circuitry for conditioning the signal from the fingerprint sensor and/or touch sensor respectively, for example, analog front ends (AFEs), analog-to-digital converters (ADCs), and the like. Also shown are electrical interfaces 730, 732, 734 which provide for communications amongst the various components.

The CPU and processing for the touch sensor and fingerprint sensor are shared in a common digital fingerprint and touch sensor controller 722. As shown, the digital fingerprint and touch sensor controller 722 includes a common sensor CPU (processor), memory, fingerprint logic, touch logic and wake up logic. The digital fingerprint and touch sensor controller 722 may be made from a single die with the analog fingerprint sensor circuit 720 and analog touch sensor circuit 724 being made from one or more separate dies or otherwise implemented with analog circuitry. The digital fingerprint and touch sensor controller 722, analog fingerprint sensor circuit 720, and analog touch sensor circuit 724 may form a single IC or form multiple ICs. The architecture of FIG. 7B may provide cost reduction and/or may be used to reduce latency as a result of less communication amongst multiple processors extending between multiple integrated circuits.

For simplicity, a display controller is not shown in FIG. 7B, but would be connected to, for example, the host 702 and digital fingerprint and touch sensor controller 722. Alternatively, the display controller may be included on controller 722.

It will be understood that the architectures shown and described with reference to FIG. 7A and FIG. 7B are by way of example and a number of variations are possible with respect to implementation. As one example, the display controller, touch controller and fingerprint controller (e.g., blocks 704, 706, 708 of FIG. 7A) may each form a separate IC. As yet another embodiment, the fingerprint controller, touch controller and display controller (blocks 704, 706 and 708 of FIG. 7A) may all be integrated within a single IC. As another alternative, the fingerprint controller may form one IC with an integrated touch and display controller forming a separate IC. As yet another example, and as shown and described in FIG. 7B, the fingerprint and touch sensor circuit (720, 724) may be separate, but may use common integrated control circuitry 722. In this case, the display control circuitry may be separate from the digital fingerprint and touch controller 722 or, alternatively, may be combined with the digital and fingerprint touch controller 722.

Figure 8:
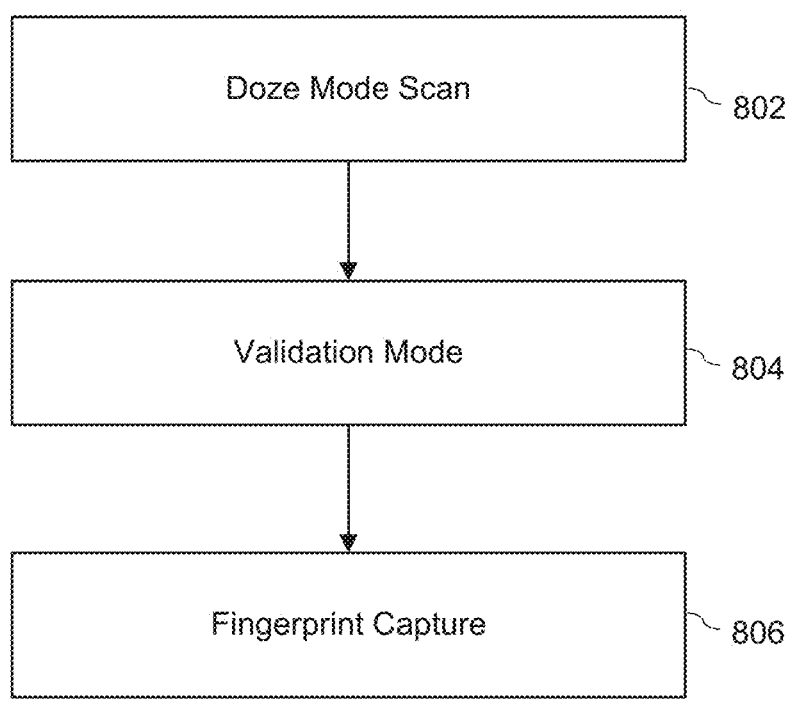
FIG. 8 is a flow diagram of an exemplary method of initiating fingerprint capture using a doze mode and validation mode.

FIG. 8 illustrates a method for initiating fingerprint capture using a low power doze mode in conjunction with a validation mode. The touch controller, for example, initially scans the touch sensor interface (e.g., display) for presence of a finger in a low power mode also referred to herein as "doze mode." After finger presence is detected, the touch controller (or fingerprint controller) scans the touch sensor interface (and/or fingerprint sensing area) for more detailed information to validate the touch for fingerprint sensing. After the touch is validated, fingerprint capture is initiated with the fingerprint controller.

At step 802, the system is placed in the low power doze mode where some of the active circuitry utilized during the normal operating mode is powered down, by for example the touch controller, since detailed spatial information for determining touch location is not needed. While in the doze mode 802, the touch controller scans for presence of a finger (or other object), which can include a finger touch or a hovering finger. The scans can be continuous or at predetermined intervals. In one example, the touch controller scans for presence of a finger anywhere across, on or proximate to the touch interface. In another example, the touch controller selectively scans an area corresponding to a location of a fingerprint sensing area. As an alternative to using the touch controller to detect the presence of a finger in doze mode, the fingerprint controller could be used in a similar lower power mode.

The touch controller may use modified scanning techniques in doze mode to detect presence of a finger (touch and/or hovering) in the relevant region of detection (e.g. in or near the fingerprint sensing area or anywhere across the touch interface.) For example, using a capacitive sensor, individual electrodes may be ganged together to measure capacitance from a larger area with fewer receiver circuits. Parallel extending electrodes may be driven simultaneously to reduce or eliminate the need for multiple scans to cover the entire detection surface. Capacitive measurements, for example, surpassing a threshold may indicate presence of a finger.

If, for example, a hovering finger is detected, the display controller may illuminate a target zone for placement of the finger. Alternatively, an element, such as illumination element 506 (FIG. 5) may be activated. As described in connection with FIG. 12, a High Brightness Mode ("HBM") may also optionally be initiated upon detection of a hovering finger when optical fingerprint imaging is used.

Once a potential finger is detected, the process proceeds by executing a validation mode as shown by step 804. In the validation mode 804, false activations caused by accidental or non-fingerprint touches are mitigated by subsequent scans of the touch interface ("touch validation") to determine whether a valid fingerprint touch is made. If a valid fingerprint touch is made, the process proceeds to step 806 where the fingerprint controller is woken up, e.g., placed in a higher power mode (via the host or directly by the touch controller, for example) and the fingerprint is captured (e.g., the fingerprint ridges, valleys, pores, minutia or other biometric data may be imaged, measured and the like) as shown in step 806. If the process determines a valid fingerprint touch is not made, the fingerprint circuitry is not awoken (or remains in a reduced power mode) and the system remains in a low power mode. For example, the system may return to the doze mode 802.

Various methods for touch validation in step 804 may be used and the methods may be more or less strict as desired. For example, in doze mode, the touch controller may initially scan for the presence of a finger only in the fingerprint sensing area. If a finger is detected in the fingerprint sensing area, the touch controller may then scan for the presence of a finger anywhere across the touch interface in validation mode. If a touch is detected across non-fingerprint sensing areas of the touch interface, the fingerprint is not validated. Conversely, if no touch is detected across non-fingerprint sensing areas, the fingerprint is validated.

The inverse procedure may also be used. For example, in doze mode, the touch controller may scan for presence of a finger anywhere across the touch interface. In validation mode, false activations of the fingerprint sensor can be avoided, for example, by checking for presence of a touch in the fingerprint sensing area. If the touch is within the fingerprint sensing area, the presence of a fingerprint is validated and the process may proceed to fingerprint capture in step 806. If the touch is outside of the fingerprint area, the presence of a fingerprint is not validated and the process may remain in a lower power state, e.g., return to doze mode.

It will be understood that when the touch controller is used in either the doze mode or the validation mode, it may be used with full sensing capability, e.g., the ability to provide both detection of an object (e.g., potential finger) and location of an object. Alternatively, the touch controller may be used in a low power mode by for example, ganging together electrodes when capacitive measurements are used. In such an alternative mode, reduced circuitry can be used to detect the presence of an object, although the ability to obtain location information may be limited.

Similarly, in the validation mode, the fingerprint controller operating in a reduced power state can be used to detect the presence of touch in the fingerprint sensing area. If a touch is detected within the fingerprint sensing area, the process proceeds to step 806; otherwise the process remains in a low power state. As a more strict method, in the validation mode, the fingerprint controller can check for the presence of ridges and valleys on the object with the presence of such features indicating of a valid touch and the absence of such features indicating an invalid touch.

As another example, the touch controller may require a "low power wake up gesture" (LPWG) to advance to the next stage of activating the fingerprint controller for fingerprint measurement (step 806). LPWG may have multiple stages. For example, the first stage may have very-low power consumption and be used to detect only the presence of an object touch or an object that is in proximity to the touch interface (doze mode). In the next stage (validation mode), a check is made for validity of the touching object is made, e.g., determining if the object a live finger and then a determination is made if the gesture is correct. Examples of LPWGs include a tap and press, a double tap, a swipe upwards, and so forth. If the fingerprint sensor is an optical sensor, the illumination source (e.g., display pixels or other source) can be turned on at the first stage of the LPWG or after the gesture is completed.

Alternatively, in the touch validation mode (step 804), the touch controller can scan the touch interface again to capture more detailed information than obtained during the doze mode (step 802). In one example, the touch controller captures a full resolution scan (e.g., a full two-dimensional touch image) using the normal operating mode, and this information is used to check for a valid touch. In another example, the touch controller captures a profile scan instead of a full touch image that it would capture in the normal operating mode, and the profile information is checked. The process may involve scanning horizontally extending and vertically extending electrodes separately to capture vertical ("y") and horizontal ("x") profiles, respectively. This technique may allow reduced latency or power consumption compared to a full touch image scan, while still providing sufficient spatial information to check for a valid touch. Multiple scans can also be checked at this stage and compared to each other to detect whether the finger has settled (e.g., stopped moving and/or a contact area with the finger no longer expanding) over the fingerprint sensor. Checking to see if the finger has settled can avoid a need for such checking with the higher resolution fingerprint sensor captures (e.g., images), further reducing power consumption and latency.

Figure 9:
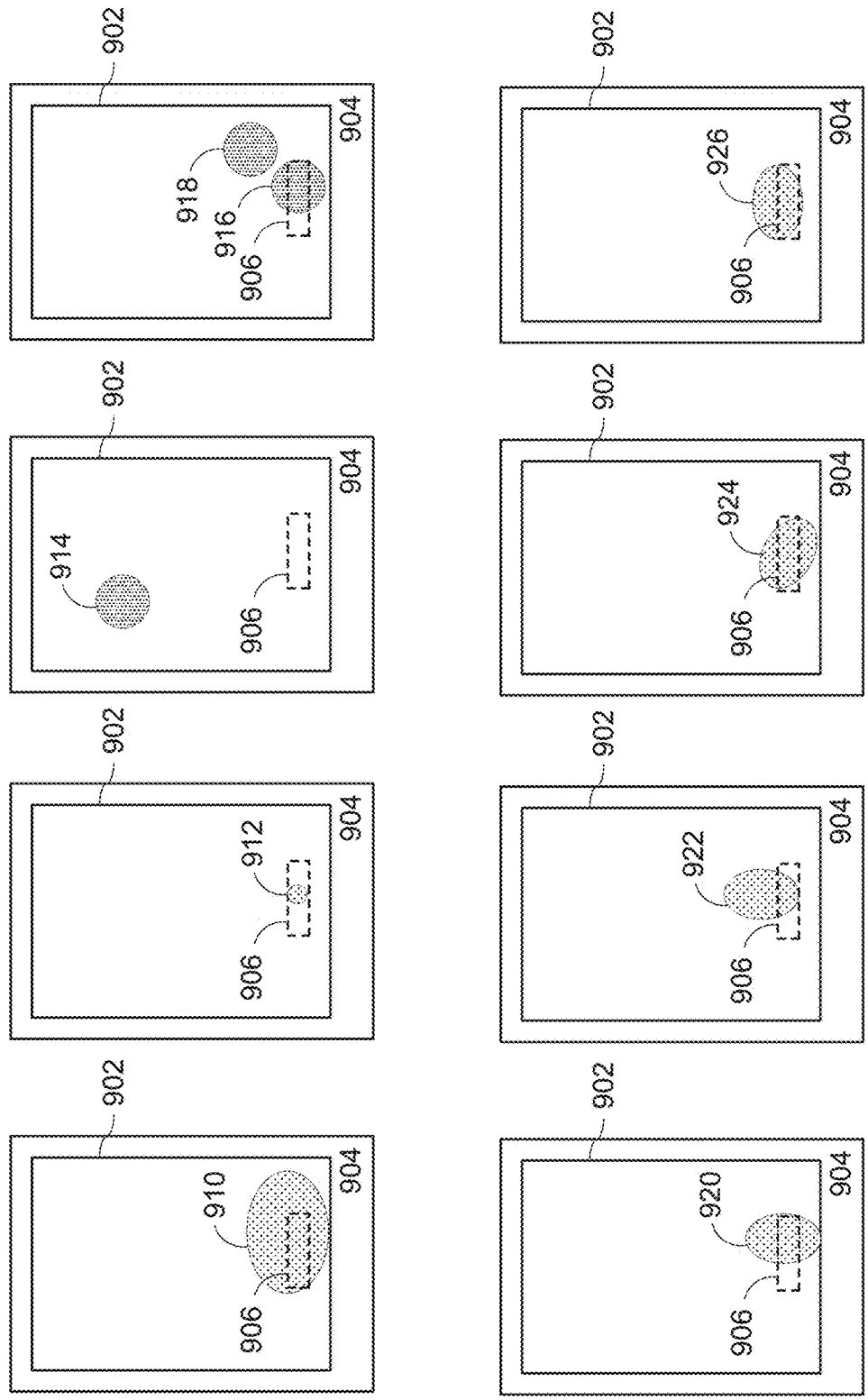
FIG. 9 is a diagram of illustrative "touches," which may be evaluated during a validation mode.

Additional examples for implementation of the validation mode are illustrated and described with reference to FIG. 9, which can be used alone or in combination with the foregoing examples. FIG. 9 illustrates several examples of touches superimposed onto a display area 902 of a device 904 having a fingerprint sensing area 906. The touches may be analyzed during the validation mode.

Touches 910-918 illustrate a series of touches that may be deemed invalid. For example, as shown in FIG. 9, the touch 910 covers the fingerprint sensing area 906, but also extends substantially into the display area 902 meaning the touch is too large for a fingerprint and, therefore, an invalid touch. The touch 912 falls generally inside of the fingerprint sensing area 906, but is too small for a valid fingerprint and, therefore, an invalid touch. The touch 914 is entirely outside of the fingerprint sensing area 906 and, therefore, an invalid touch. Touch 916 is assumed to be about the proper size and over the fingerprint sensing area 906; however, a second touch 918 simultaneous to the touch 916 renders the touch invalid.

Also shown are a series of touches 920-926, each of which is the proper touch size and each of which sufficiently overlaps the fingerprint sensing area 906. Thus, in the example, each of the touches 920-926 represents a valid touch that is validated in step 804 and thus causes the process to proceed to step 806 for fingerprint capture.

In the examples of FIG. 9, the criteria (e.g. touch size, number of touches and touch location) are checked under the assumption that a user intending to provide a fingerprint is likely to provide a single touch input to the fingerprint location using the larger face of the finger, as opposed to, for example, the smaller edge of the fingertip, a smaller stylus tip, a multi-touch input, or a touch outside the fingerprint region that would be more indicative of accidental touches or non-fingerprint touch interface inputs. Such assumptions are, of course, by way of example. Any suitable touch or combination of touches may be deemed valid or conversely invalid.

Returning to step 804 of FIG. 8, various touch sensing techniques can also distinguish between grounded objects (e.g. a finger) and ungrounded objects (e.g. a coin or water resting on the surface) as part of the validation mode. Other information or other sensors in the device may be used at the validation stage to validate the touch. For example, if the touch screen is equipped with force sensing capabilities, the force information may be checked for intentional fingerprint touches, such as checking whether the touch is beyond a force threshold or within a predetermined force range.

The touch validation criteria and scanning techniques described above are not limited to the process flow described in FIG. 8, which describes a technique for waking the host device or fingerprint controller from a sleep state. For example, these techniques may be used when the device display is on and the device is in an unlocked state as there may still be situations where fingerprint capture is desired (such as a banking transaction). In such instances, the initial doze mode scan is not needed, but the touch sensor information can be checked for a valid touch before initiating the fingerprint capture to avoid unnecessary fingerprint capture or avoid a false rejection due to a poor image captured when the fingerprint was not ready to be imaged. Additionally, the fingerprint controller can remain awake but idle (e.g., in a low power state) during touch validation, rather than being woken up from a powered down state, in order to save boot time and minimize latency between the determination of a valid touch and fingerprint capture.

To illustrate the foregoing, examples of the process of FIG. 8 using the architecture of FIG. 7A will now be described by way of illustration. Although described with reference to FIG. 7A, the process is equally applicable to any suitable architecture including without limitation the architecture of FIG. 7B.

As a first example, the architecture shown in FIG. 7A uses the process of FIG. 8 to initiate by a touch controller a wake process for an optical fingerprint sensor. This example illustrates a process for waking the device from a low power state (e.g., a mobile device that is asleep and in a locked state).

Initially, in doze mode 802, the host 702 places the touch controller 706 into a low power "fingerprint sensing" mode where the touch controller 706 scans the touch interface for the presence of a finger or other object only in fingerprint sensing area (for example 305b in FIGS. 3A-3B) or, alternatively anywhere across the touch interface. At this point, the fingerprint controller 708 is in a low power wake on event mode. The display controller 704 may dimly indicate the location of the fingerprint sensing area, e.g., by illuminating part of a display 305b (FIG. 3B) or by activating an illumination element 506 (FIG. 5). The host 702 may enter a low power mode.

In the doze mode 802, the touch controller 706 periodically scans for a finger. When a finger (or other object) is detected, the touch controller 706 awakens to a higher power mode. In the higher power mode, the touch controller 706 reads the full touch profiles in the validation mode 804. One example of full touch profiles was described in connection with FIG. 9, but any suitable method of validation may be used including the other examples described in connection with step 804 in FIG. 8. The touch controller 706 uses the full touch profiles to check for a valid touch to prevent false wake-ups. No touch information needs to be sent to the host 702 at this stage, as the touch controller 706 may conduct checks for a valid touch.

Once a valid touch is detected in step 804, the touch controller 706 notifies the display controller 704 and the fingerprint controller 708 that a valid fingerprint touch has been detected. Such notification may be direct, e.g., no communication with or action by the host is required—although the host 702 may optionally be used, e.g., the touch controller 706 may notify the host 702 and the host may then notify the fingerprint controller 708 and/or display controller 704. The process then proceeds to step 806. At this stage, the display controller 704 may illuminate the fingerprint with the display as part of optical fingerprint imaging. During this stage, display brightness may be increased to provide sufficient contrast for optical fingerprint image capture. When the fingerprint controller 708 receives the finger detect signal, it will start to capture data via optical sensors.

In step 806, the fingerprint controller 708 in conjunction with various fingerprint sensor elements captures fingerprint data, e.g., images ridges, valleys and other features via optical imaging. While capturing data, the fingerprint controller 708 may analyze the data to determine that a real finger is touching the sensor. The fingerprint sensor may also analyze the data to select the best frame to use for fingerprint matching. The host 702 need not be notified until a frame is selected for fingerprint matching. During the capture of fingerprint data, the host 702 may remain in a low power state or, alternatively, the touch controller 706 may signal host 702 to start wake up to reduce latency.

The fingerprint controller 708 notifies the host 702 and touch controller 706 that a frame has been selected. For example, when the fingerprint controller 708 has selected a frame for fingerprint matching, it sends an interrupt signal to alert the host 702 that an image is waiting and, if necessary, for the host 702 to wake up. In parallel, the fingerprint controller 708 notifies the touch controller 706 that the fingerprint image capture has finished. Alternatively, the host 702 may notify the touch controller 706 that the fingerprint scan is complete.

The fingerprint controller 708 sends the selected frame to the host. In parallel, the touch controller 706 may notify the display controller 704 that the fingerprint capture is complete so that the display controller 704 may turn off the illumination in the fingerprint sensing area. Alternatively, the host 702 may notify the display controller 704 to turn off illumination. In certain embodiments, the notification to turn on and off illumination may come from the fingerprint controller 708.

Once fingerprint capture is complete and the host 702 receives the data, the host 702 performs matching (e.g., authentication) and decides next steps. If the match fails, the host 702 may decide to initiate another low power fingerprint wake up or simply signal the user for another fingerprint. If the match succeeds, the host 702 may proceed to unlock the device and bring the rest of the system to full power.

As yet another example, assume the host device is in a full power state (e.g., a mobile device that is awake and in an unlocked state). The architecture of FIG. 7A and method of FIG. 8 may be used to initiate fingerprint capture when fingerprint matching is desired for purposes other than unlocking the device, such as to authorize a transaction or for finger identification. However, in this example, the doze mode is not required.

Similar to the previous example, the host 702 places the touch controller 706 into a "fingerprint sensing" mode. In the fingerprint sensing mode, the touch controller 706 responds to touches anywhere on the touch interface (normal mode) with full resolution to determine touch location. The host 702 signals the display controller 704 to display a fingerprint indicator on the screen over the fingerprint sensing area. To reduce latency, the host 702 may also wake the fingerprint controller 708 to save boot time. If a finger is detected over the fingerprint sensing area, the touch controller 706 notifies the fingerprint controller 708 and the display controller 704. Alternatively, the host 702 may receive a signal from the touch controller 706 and the host notifies the display controller 704.

The touch controller 706 scans for a finger at, for example, predetermined intervals. The touch controller 706 responds to touches anywhere on the screen (normal mode). The display controller 704 continues to display an indicator in the fingerprint sensor area, while the fingerprint controller 708 remains in an idle (low power) state.

The remaining steps are similar to those described in the preceding example, except that the host 702 remains awake throughout. Thus, once the touch controller 706 detects a finger, the fingerprint controller 708 is awoken and the fingerprint or series of fingerprints are captured. The fingerprint controller 708 then notifies the host 702 and touch controller 706 that a frame has been selected. The fingerprint controller 708 then sends the selected frame to the host 702. The host 702 then performs the matching and determines next steps.

In the above examples, the fingerprint image need not be sent to the host 702 for matching. As an alternative, the fingerprint matching can be performed directly on the fingerprint controller 708 for increased security and/or decreased latency. In this case, the steps above maybe modified so that the fingerprint controller 708 notifies the host 702 when a successful fingerprint match is achieved, rather than when a frame has been selected.

Also, in the above examples, an indicator need not be displayed in the fingerprint sensing area at all times or may be eliminated. Further, the touch controller 706 may be configured to detect a hovering finger not yet in contact with the sensing surface, and the display controller 704 may optionally display and indicator in the fingerprint sensing area in response to detection of a hovering finger. A hovering finger may be detected through known techniques such as profile sensing (multiple 1D responses) and 2D direct capacitive image analysis.

In any of the examples above, the host 702 can check the touch sensor information for a valid touch to avoid false activations of the fingerprint sensor. If the host processor checks the touch sensor information, direct communication between the touch controller 706 and fingerprint controller 708, and between touch controller 706 and display controller 704 may be eliminated. In this case, the touch controller 706 can send touch coordinates or other spatial touch information to the host 702, and the host 702 can check this information for a valid touch before waking the fingerprint controller 708 or initiating fingerprint capture. However, as noted, when the touch controller 706 performs the check for a valid touch, host 702 involvement is obviated, which can improve latency, including the cases where the device is in a low power locked state and at full power.

Figure 10:
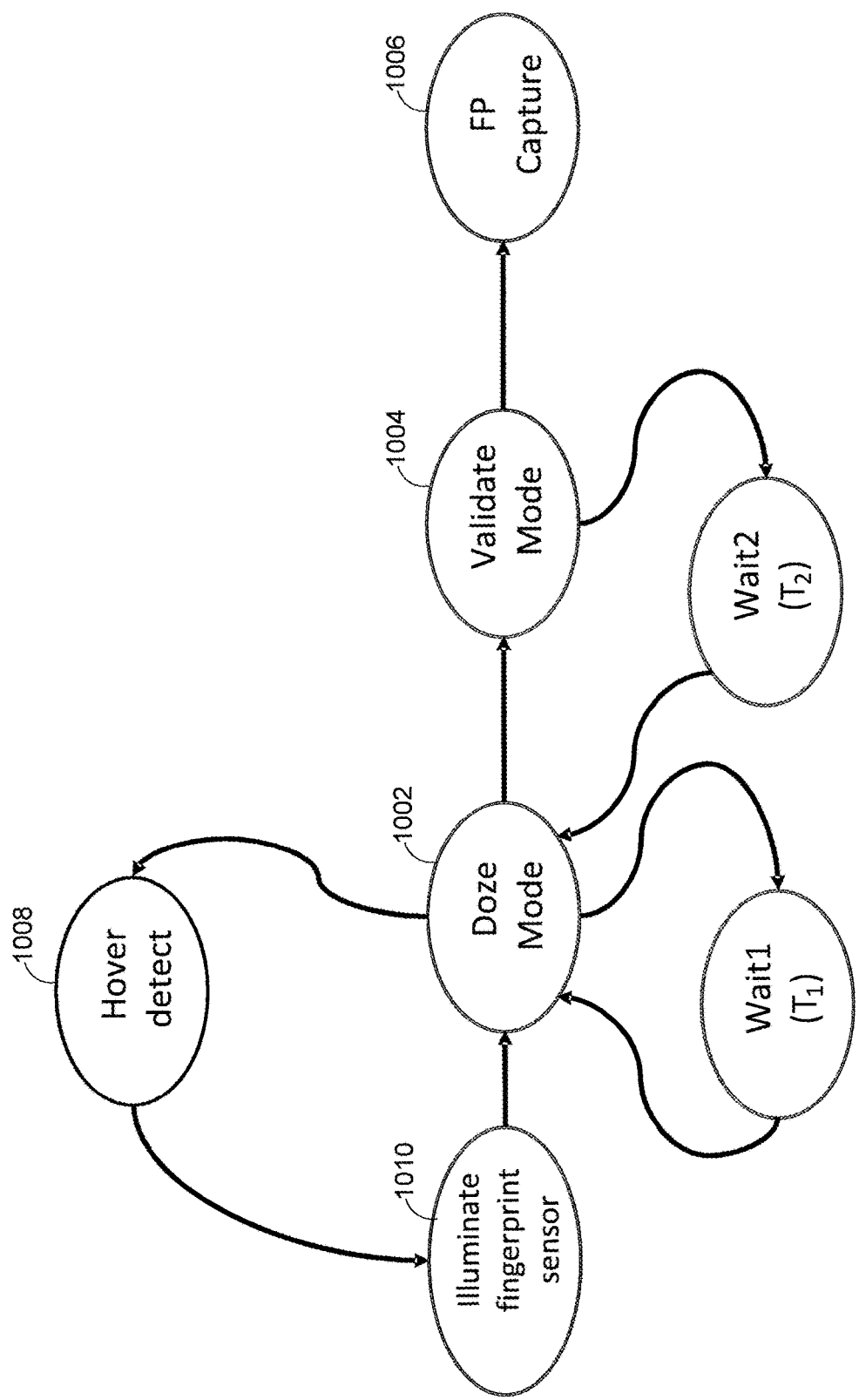
FIG. 10 is a state diagram illustrating a method of initiating fingerprint capture using a doze mode and validation mode.

FIG. 10 illustrates an example of a state diagram for a process of initiating fingerprint capture with a touch screen sensor, which further illustrates examples of certain wait times and counters that may be used.

In state 1002, the electronic device transitions to a low power state and the touch controller and fingerprint controller transition to a doze mode. In certain embodiments, the device may be locked in this state.

If presence of a finger (or other object) is detected in doze mode, the device transitions to a touch validation mode as shown by state 1004. In state 1004, a validation check is performed using, for example, one or more of the methods previously described. If a valid touch is determined during touch validation mode (state 1004), the device transitions to a fingerprint capture state as shown by state 1006.

If during state 1002, the process determines that no finger is present after a scan in touch doze mode, the device waits a predetermined time interval or period ("T1"), after which it performs another doze mode scan. For example, T1 may be on the order of 10 to 30 ms.

If during state 1004, the process determines that the touch is invalid during touch validation, the device may wait a predetermined time interval or period ("T2"), after which it reenters the touch doze state 1002. With respect to T2, the system may also add to a counter in response to an invalid touch and set T2 after a number of multiple invalid touches are detected to further conserve power. To minimize power consumption due to false activation, the time period that the device waits after the touch doze scan fails to detect a touch (T1) may be much less than the time period that the device waits after an invalid touch (T2) (i.e., T2>>T1).

Also shown is an optional hover detect state 1008. In state 1008, the process detects (e.g., scans) for a hovering finger or other object. If a hovering finger is detected, the process may illuminate the fingerprint sensor or portion of display/touch screen corresponding to a fingerprint sensing area thereby providing the user with, for example, a target of where to place the fingerprint. Once the fingerprint touches, illumination of the fingerprint sensing area may be altered, for example, made brighter to facilitate optical imaging of the fingerprint.

Figure 11:
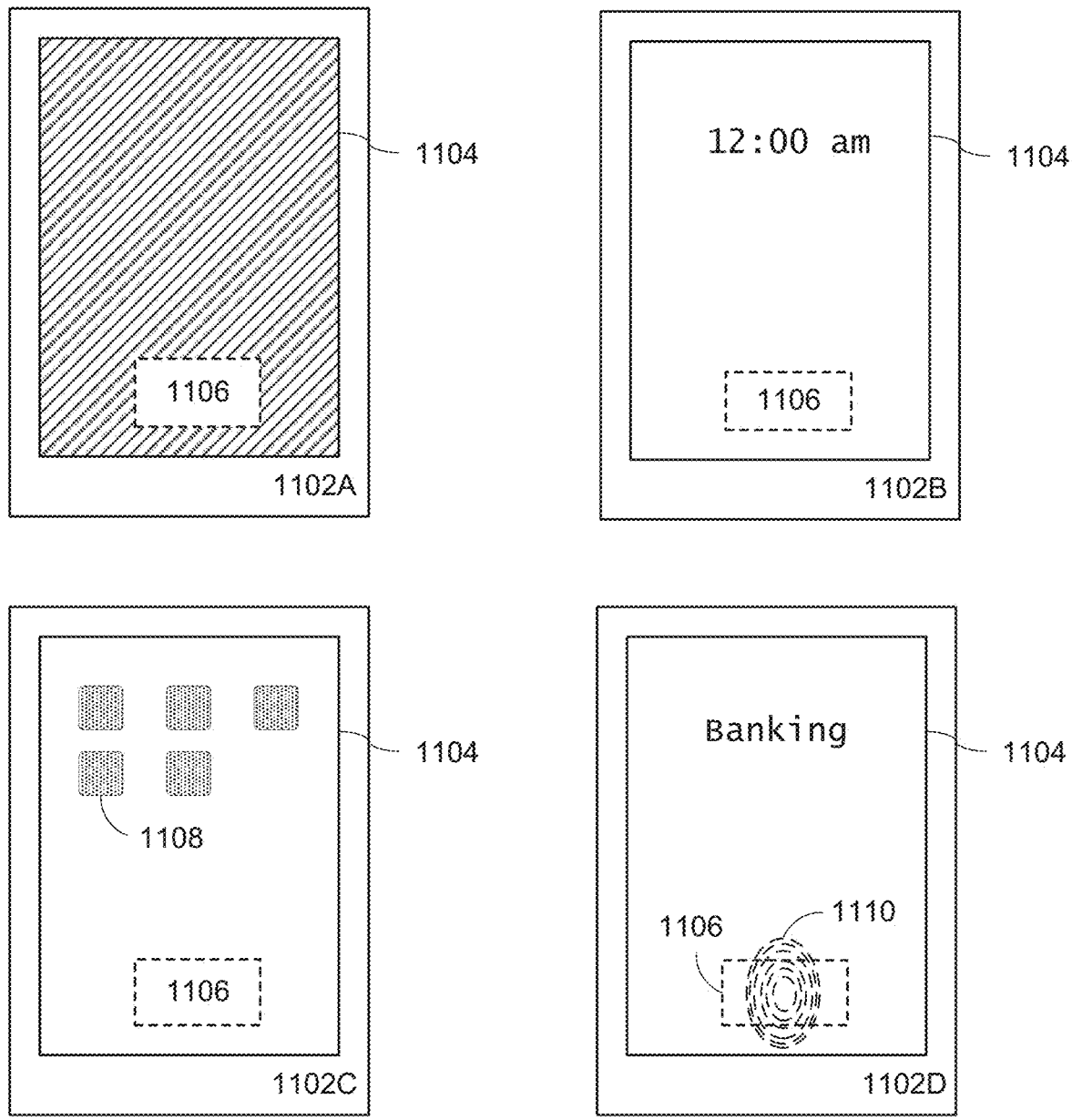
FIG. 11 illustrates block diagrams depicting exemplary electronic devices having both a touch screen interface and an input object sensing interface operating in various modes.
Figure 12:
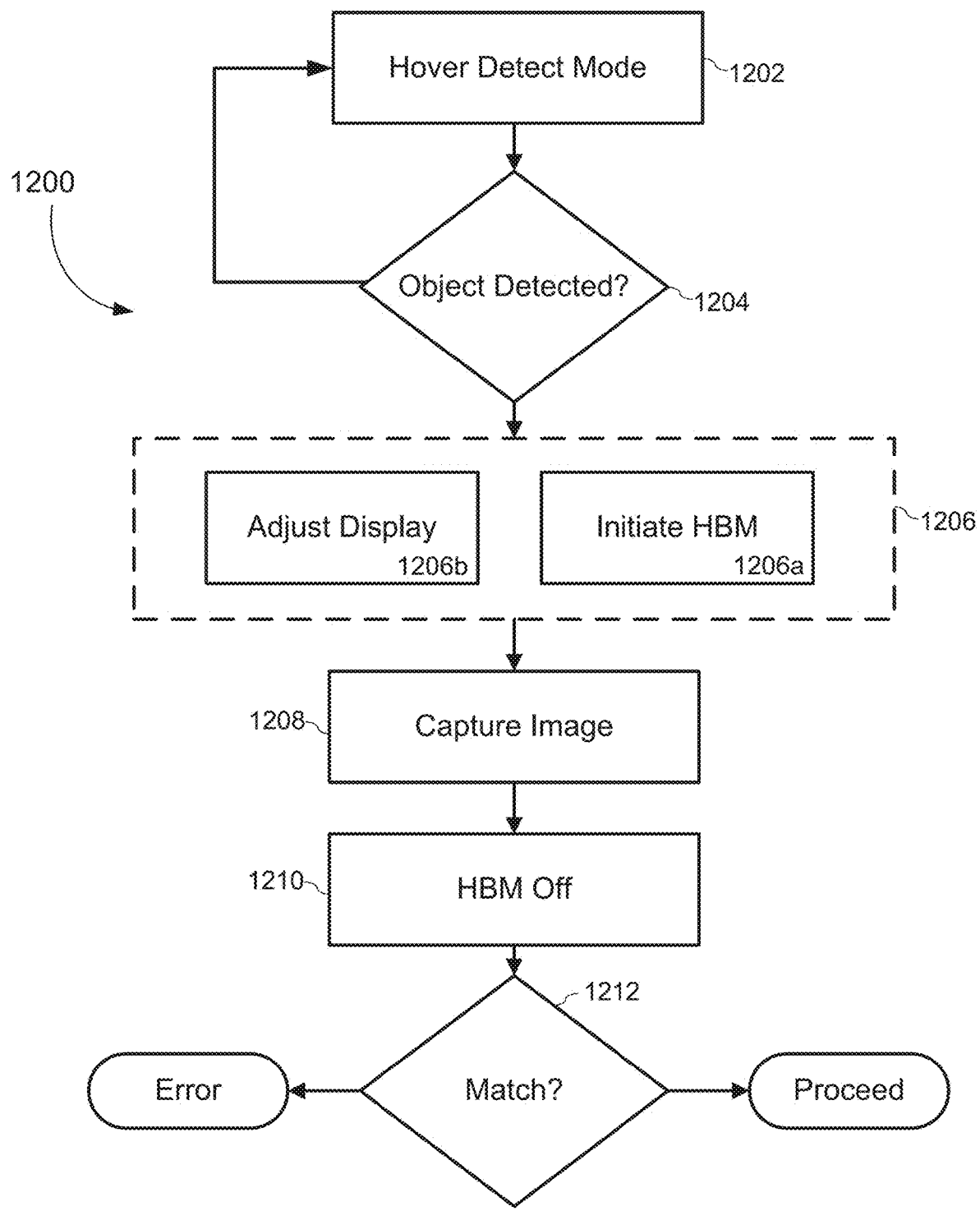
FIG. 12 is a flow diagram of an exemplary method of initiating input object imaging using hover detection.

FIGS. 11-12 illustrate examples of systems and methods that combine hover detection with illumination or activation of a sensing area used in connection with imaging of an input object, such as a biometric input object. Although the systems and methods are generally described with specific reference to imaging a fingerprint, it will be understood that the systems and methods may be used to image any biometric input object and more generally any input object. The systems may employ any suitable architecture which includes a touch sensor and imaging sensor (e.g., optical biometric sensor) including, for example, the architecture described in connection with FIGS. 7A-7B.

FIG. 11 illustrates an electronic device, such as a mobile device, e.g., mobile phone. The electronic device is shown operating in various modes or states, generally labeled 1102A-D.

The electronic device includes a display 1104, which for example is an LED, OLED or other emissive display. The electronic device also includes an imaging sensor 1106 for imaging an input object, such as a biometric input object, e.g., fingerprint. The imaging sensor 1106 may be under a cover glass or lens of the display and may further be disposed above, underneath or coplanar with pixels (display elements) of the display. In certain embodiments, the imaging sensor 1106 may be disposed within a discrete portion of the display. In other embodiments, the imaging sensor 1106 may distributed throughout all, substantially all, or a larger area (non-discrete area) of the display and, thus, may be capable of imaging an input object anywhere in the display area. In certain embodiments, the imaging sensor 1106 is an optical sensor, although as noted below, other sensors such as capacitive and ultrasonic sensors may be used in conjunction with hover detection.

The electronic device also includes a touch sensor, which may extend generally throughout an entire area of the display. As previously described, the touch sensor may, for example, be a capacitive sensor. As described in connection with FIG. 7A, the display 1104, touch sensor and imaging sensor 1106 are typically controlled by display controller 704, touch controller 706 and fingerprint controller 708

(which controllers may be variously combined), respectively. Some or all functionality may also be controlled by a host (e.g., host 702).

In state 1102A, the electronic device is shown in a lower power or ambient state such that the display 1104 is turned off, e.g., the display generally presents a black screen. The electronic device may or may not be in a locked state.

In state 1102B, the display is on, however, the electronic device is in a locked state, such that some user authentication is required before access to the electronic device is permitted. In state 1102B, a basic display, such as a clock, wallpaper and the like may be presented.

In state 1102C, the electronic device is on and unlocked. In this state, the electronic device may display, for example, various application icons 1108 accessible to the user such as typically presented on a home screen. Icons 1108 may correspond to applications and/or represent a set of related or grouped applications accessible via icon selection.

In state 1102D, the electronic device is shown executing an application, for example, a banking application. Some applications may require authentication to perform certain operations. Thus, the application may display a fingerprint indicator, guide or target 1110 over an area above the imaging sensor 1106 to guide placement of a user's finger for purposes of completing a required authentication process.

In the examples of FIG. 11, and corresponding method described below in connection with FIG. 12, the imaging sensor 1106 may be an optical sensor typically comprising an array of optical sensing elements. To perform optical imaging of the input object (e.g., fingerprint), a sensing area or region (e.g., area above the imaging sensor 1106) is illuminated during the imaging process. The illumination may be provided by display pixels of the display proximate to the area or region of the imaging sensor 1106 or, alternatively, by a separate light source. In certain embodiments, the display pixels may be driven to a High Brightness Mode ("HBM") to facilitate imaging of the input object. By way of example, display pixels that are active for normal display purposes may have brightness on the order of 250-300 nit (cd/m$^2$), while display pixels operating in HBM may have brightness on the order of 400-600 nit. Pixels are generally driven to HBM by increasing the current to the display pixels.

As will be appreciated, the amount of power available to the display may be limited. Thus, driving display pixels in the area of the imaging sensor 1106 to HBM may cause other portions of the display to dim. Moreover, in certain displays, it is not possible to drive only a selected portion of the display to HBM. Instead, current to the entire display must be increased thereby causing a corresponding increase in the intensity of all active display pixels assuming available power. Thus, placing the display in HBM for optical imaging may cause the entire display to "flash" while HBM is active. Such disruption to the display may be undesirable to the user. To address this problem, the display may be placed in a dark background mode ("DBM") or the display may be otherwise adjusted during HBM as described further below in connection with FIG. 12.

FIG. 12 illustrates a method 1200 that may be used in connection with an electronic device, such as described in connection with FIG. 11, to detect a hovering finger having a fingerprint (or other biometric having features which may be imaged) to initiate HBM for optical imaging. Optionally, the method 1200 may also be used to adjust portions of the display outside of an area of the imaging sensor 1106, e.g., by placing such portions in DBM and/or adjusting the display to provide a consistent display (e.g., constant or apparent constant brightness) to the user. The method of FIG. 12 may decrease latency by initiating HBM, or other sensor activation, before the finger reaches the sensing area, e.g., while the finger is hovering. The method of FIG. 12 may be managed by one or more processors, such as one or more of the processors described in connection with FIGS. 7A-7B.

In step 1202, the electronic device is placed in a hover detect mode wherein the electronic device detects a hovering finger or other object. The hover detect mode may be implemented as described in connection with state 1008 (FIG. 10). By way of example, the hover detect mode may detect a hovering finger at a range on the order of about 10-15 mm from the display.

Control of the hover detect mode can be managed from the host (e.g., 702 with reference to FIG. 7A), which in turn controls the touch controller (e.g., 706 with reference to FIG. 7A) and display controller (e.g., 704 with reference to FIG. 7B). Use of the host may be appropriate where, for example, the electronic device is already active, such as states 1102C and 1102D. Alternatively, the hover detect mode may be managed by the touch controller 706 and/or fingerprint controller 708. Use of the touch controller and/or fingerprint controller 708 to manage the hover detect mode may be appropriate where the host is in a sleep, ambient or lower power state, such as states 1102A and 1102B. As previously described, the touch controller 706, fingerprint controller 708, and the display controller 704 may be interconnected to facilitate direct interaction with the display (e.g., turn display pixels on and off) thereby obviating or delaying the need for host intervention.

In the hover detect mode, the method scans the touch interface (e.g., display 1104 or more generally touch sensor) for a hovering finger, or other input object, as shown in step 1204. The touch controller may scan the entire display 1004 for the hovering finger. If the entire display is scanned, the method proceeds to the next step after further determining that the hovering finger is over the imaging sensor 1106. Alternatively, the method may only scan the area proximate to the imaging sensor 1106 for the hovering finger in which case separate determination that the hovering finger is over the imaging sensor 1106 in unnecessary. Further, as previously described, the imaging sensor 1106 may be distributed throughout the display, e.g., capable of imaging an input object anywhere on, or within a non-discrete portion of, the display. In this case, further determining that the input object is over the imaging sensor 1106 may also be unnecessary.

As previously described, the touch sensor may or may not be operated with full sensing capability during the hover detect mode. For example, the hover detect mode may include ganging electrodes of a capacitive touch sensor together to measure capacitance from larger areas if detailed spatial information is unnecessary. Typically, the hover detect mode can detect a finger on the order of tens of milliseconds prior to arrival of the finger (fingerprint) on the touch interface.

Once a hovering finger is detected in the area proximate to the imaging sensor 1106, the method 1200 proceeds to step 1206. In the example, step 1206 is illustratively shown as including two components, 1206a and 1206b. In step 1206a, an area proximate to the imaging sensor 1106 is illuminated to facilitate illumination of the input object for imaging. Such illumination may include initiating a HBM by driving display pixels in the area of the imaging sensor 1106 to a high brightness state as previously described, e.g., by increasing current to the pixels, which in certain embodiments requires increasing current to the overall display.

In cases where the imaging sensor 1106 is distributed throughout all or part (e.g., non-discrete area) of the display, the location of the hovering finger may be used to determine which portion of the display is illuminated, e.g., driven to HBM for purposes of imaging the input object. The area of the display driven to HBM may be based on an area where the hovering finger is detected or where contact between the finger and display occurs.

As will be appreciated, increasing the current to the display is typically an analog process and, therefore, requires a period of time $\Delta T_{HBM}$ before HBM is fully realized. In certain embodiments, the transition to HBM is controlled to match arrival of the finger, e.g., based on an actual, estimated, or assumed rate of approach of the finger. Arrival of the finger can be determined or estimated using various methods. For example, arrival the finger can estimated by measuring the amplitude of the hover detection signal and/or measuring the width of a detected footprint (e.g., width of the finger footprint reduces and the shape is sharper as the finger gets closer to the display 1104/imaging sensor 1106). Alternatively, the time period between detection and finger arrival may be an assumed value. Thus, HBM may be timed so that HBM is fully realized at the same or approximately the same time as arrival of the finger to the area of the imaging sensor 1106 thereby decreasing latency. Alternatively, HBM may simply be initiated as quickly as possible, for example, HBM is activated as quickly as possible when the finger contacts, or is estimated to contact, the sensing area of the display 1104.

Step 1206b includes optional adjustment of the display 1104 of the electronic device. Step 1206b is used, for example, to mitigate display anomalies caused by driving areas of the display proximate to the imaging sensor 1106 to HBM. The particular adjustment to the display depends on the present state or mode of the electronic device and/or the desired effect for the display as described below.

In one embodiment, display pixels in portions of the display 1104 outside of the area of the imaging sensor 1106 are placed in a dark background mode ("DBM"). For example, the display pixels outside of the area of the imaging sensor 1106 are turned off or made black. The transition to DBM may be immediate or implemented over a period of time such that the pixels fade to the DBM. For example, the fade to DBM can be timed to coincide with arrival with the finger, e.g., full DBM occurs when the finger arrives. For example, a rate of fade to DBM can be synchronized with the rate of approach of the finger. Placing the pixels outside of the area of the imaging sensor 1106 in DBM can mitigate or prevent the appearance of a "flash" when the display pixels near the imaging sensor 1106 are placed in HBM. As will be appreciated, if the electronic device is in a state or mode, such as 1102A, a transition to DBM is unnecessary since the area of the display outside of the imaging sensor 1106 is already turned off or black.

In another embodiment, areas of the display outside of the area of the imaging sensor 1106 may be adjusted to create the appearance of a constant brightness even though overall current to the display is increasing during the transition to HBM. By way of example, in a display having Red, Green, Blue (RGB) pixels, RGB pixel values are adjusted such that the relative brightness appears to be constant even though current to the display, and hence individual pixels, increases. As noted above, the transition to HBM via an increasing current is an analog process that occurs over a period of time $\Delta T_{HBM}$. Typically, adjustment of display pixel values is a digital process that is much faster than $\Delta T_{HBM}$. Consequently, any adjustment of pixel values to achieve a constant display may involve multiple iterations to sequentially step the RGB values in sync with the increasing current of the display. For example, as the current to the display increases, the RGB values are correspondingly reduced.

Adjustment of the display in step 1206b may include other functions. For example, when a hovering finger is detected, the host 702, fingerprint controller 708, or touch controller 706 may instruct the display driver 704 to display a visual indicator, such as target, guide or icon to assist the user in placement of the finger in an area over the imaging sensor 1106, such as illustrated by target 1110 (FIG. 11). The visual indicator or target may be displayed before HBM is initiated (e.g., before step 1206a), or before HBM is fully realized to avoid the visual indicator or target from being obscured as a result of HBM illumination in the area of the imaging sensor 1106.

Once HBM, or more generally illumination of the area proximate to imaging sensor 1106, is realized, the process proceeds to step 1208 and the fingerprint is captured, which typically although not necessarily occurs when the finger contacts a surface of the display. Optionally, the process may wait for a predetermined amount of pressure to be applied before capturing an image of the fingerprint. The amount of pressure may be detected by a separate sensor. The process may also wait to determine that touch is valid before capturing the fingerprint as described, for example, in connection with FIGS. 8-10. Once the fingerprint is captured, the HBM is disabled or turned off as shown in step 1210. Any target, guide or icon for the fingerprint placement may also be removed from the display.

After fingerprint capture, the system will typically compare the fingerprint image to a template for authentication as shown in step 1212.

Depending on the results of authentication and present state of the electronic device, further actions will typically occur. For example, it may be necessary to reverse adjustment to the display undertaken in step 1206b. If the display was placed in DBM, the display pixels may need to be returned to their state prior to DBM. If the color values of the display pixels where changed via an iterative alteration of values, the iterative process may need to be reversed to avoid the appearance of dimming as the current decreases when HBM is disabled. In addition, successful authentication may result in the device being placed in a different mode or state. For example, if the electronic device was in an ambient, sleep or locked state, the electronic device may present a home screen. If authentication fails, indication of the failure may be provided to the user.

Although FIGS. 11-12 are described in the context of an optical fingerprint sensor, the systems and methods are equally applicable to imaging of other biometrics or input objects. Moreover, certain aspects are applicable to other types of sensors, such as capacitive and ultrasonic sensors, that do not require illumination for object imaging. For example, the touch sensor may be used detect the presence of an object proximate to a capacitive or ultrasonic imaging sensor for purposes of displaying a target indicator to guide placement of a fingerprint and/or initiating the biometric sensing process.

While the forgoing description includes examples particularly advantageous for integrating fingerprint sensors with touch screen sensors in the active area of a display, the above techniques may also be used to integrate fingerprint sensors with opaque touch pad sensors. Also, the above techniques may be used to integrate other types of biometric sensors having different resolutions, beyond just sensors configured to detect fingerprint patterns and touch locations.

It will be understood that the touch sensor may be used for the doze mode detection and the validation mode, or for one mode while the fingerprint sensor is used for the other. Alternatively, the fingerprint sensor may be used for both the doze mode and validation mode. For example, if the touch sensor is not sensitive in the fingerprint sensing area, it may be desirable to use the fingerprint sensor for the doze mode detection. The fingerprint sensor could also be used for validation by checking for fingerprint ridges.

While certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 104). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

The foregoing embodiments can be used for fingerprint sensors integrated within opaque touch pads, rather than the active area of a display. In this case the touch screen sensor mentioned above can be replaced with the touch pad sensor.

If an optical fingerprint sensor is used, an auxiliary light source instead of or in addition to the display may be used to illuminate the fingerprint. In the examples where the display is used as a light source to illuminate the fingerprint, this may be used to provide sufficient contrast for fingerprint image capture, for pulse or liveness detection, or for some combination of these. To further reduce power, the illumination from the display can utilize a subset of display pixels or lower brightness for detecting when the finger is sufficiently settled to acquire a fingerprint image. At this point the illumination can be increased to provide higher SNR for the actual fingerprint acquisition.

In the examples above, doze mode, validation mode, or both may be replaced with low power touch wake up gestures to avoid false wake ups.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments of this invention are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of imaging a fingerprint of a finger in an electronic device including a display, a touch sensor having a touch interface, and an optical fingerprint sensor having a sensing region, the method comprising:
    placing the electronic device in a hover detect mode, the hover detect mode scanning for the finger hovering proximate to the touch interface;
    detecting the finger while the finger is hovering;
    initiating illumination in the sensing region;
    capturing an image of the fingerprint of the finger in the sensing region; and
    disabling the illumination in the sensing region.

2. The method of claim 1, wherein the initiating illumination in the sensing region comprises initiating a high brightness mode (HBM) of display pixels proximate to the sensing region in response to detecting the finger.

3. The method of claim 2, wherein a transition to the HBM is synchronized with a rate of approach of the finger.

4. The method of claim 2, wherein the sensing region and the display pixels are in a region of the display determined from a location of the finger.

5. The method of claim 3, wherein in the rate of approach of the finger is an assumed value.

6. The method of claim 3, wherein the rate of approach of the finger is based on an amplitude of a signal received in connection with the detecting the finger while the finger is hovering.

7. The method of claim 1, further comprising:
    adjusting the display outside of the sensing region in response to detecting the finger while the finger is hovering.

8. The method of claim 7, further comprising:
    placing the display outside of the sensing region in a dark background mode (DBM).

9. The method of claim 8, wherein the display outside of the sensing region fades to the DBM.

10. The method of claim 9, wherein a rate of fade to the DBM is synchronized with a rate of approach of the finger.

11. The method of claim 7, further comprising iteratively adjusting display pixel values outside of the sensing region to compensate for an increase in current to the display.

12. The method of claim 1, further comprising
displaying a guide for placement of the fingerprint after detecting the finger while the finger is hovering.

13. The method of claim 12, wherein the displaying the guide occurs before a HBM is fully realized.

14. The method of claim 1, wherein the detecting the finger, comprises:
first detecting the finger hovering proximate to the touch interface; and
second detecting the finger hovering proximate to the sensing region.

15. The method of claim 1, further comprising:
detecting contact between the finger and the touch interface before the capturing the image of the fingerprint.

16. The method of claim 15, wherein pressure is sensed to facilitate the detecting contact between the finger and the touch interface.

17. The method of claim 1, wherein the capturing the image of the fingerprint is in response to detecting a valid touch.

18. An electronic device, comprising:
a memory; and
one or more processors in communication with the memory, wherein the one or more processors are configured to:
operate the electronic device in a hover detect mode, the hover detect mode scanning for a finger hovering proximate to a touch interface;
receive a signal when the finger hovering proximate to the touch interface is detected;
initiate illumination in a sensing region of an optical sensor;
receive image data corresponding to an image of a fingerprint of the finger from the sensing region; and
disable the illumination in the sensing region.

19. The electronic device of claim 18, wherein the one or more processors include a host processor of the electronic device.

20. The electronic device of claim 19, wherein the one or more processors include a touch controller.

21. The electronic device of claim 18, wherein the one or more processors are further configured to initiate the illumination in the sensing region using a high brightness mode (HBM).

22. The electronic device of claim 21, wherein a transition to the HBM is synchronized with a rate of approach of the finger.

23. The electronic device of claim 18, wherein the one or more processors are further configured to:
adjust a display outside of the sensing region after detecting the finger hovering.

24. The electronic device of claim 23, wherein the one or more processors are further configured to:
place the display outside of the sensing region in a dark background mode (DBM).

25. The electronic device of claim 24, wherein the display outside of the sensing region fades to the DBM.

26. The electronic device of claim 25, wherein a rate of fade to the DBM is synchronized with a rate of approach of the finger.

27. The electronic device of claim 23, wherein the one or more processors are further configured to:
iteratively adjust pixel values outside of the sensing region to compensate for an increase in current to the display.

28. The electronic device of claim 18, wherein the one or more processors are further configured to:
display a guide for placement of the fingerprint after detecting the hovering finger.

29. An electronic device, comprising:
a memory; and
a touch controller in communication with the memory, configured to:
operate in a hover detect mode, the hover detect mode scanning for a finger hovering proximate to a touch interface;
detect the finger while the finger is hovering proximate to the touch interface;
first signal that the finger has been detected to initiate illumination in a sensing region of an optical sensor;
second signal to disable the illumination in the sensing region after capturing an image of a fingerprint of the finger.

30. The electronic device of claim 29, wherein the touch controller is further configured to initiate the illumination in the sensing region using a high brightness mode (HBM).

31. The electronic device of claim 30, wherein a transition to the HBM is synchronized with a rate of approach of the finger.

32. The electronic device of claim 29, wherein the touch controller is further configured to:
adjust a display outside of the sensing region after detecting the finger while the finger is hovering.

33. The electronic device of claim 32, wherein the touch controller is further configured to:
place the display outside of the sensing region in a dark background mode (DBM).

\* \* \* \* \*